United States Patent
Harada et al.

(10) Patent No.: US 10,547,054 B2
(45) Date of Patent: Jan. 28, 2020

(54) ACTIVE MATERIAL, NONAQUEOUS ELECTROLYTE BATTERY, BATTERY PACK AND VEHICLE

(71) Applicant: Kabushiki Kaisha Toshiba, Minato-ku (JP)

(72) Inventors: Yasuhiro Harada, Isehara (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 130 days.

(21) Appl. No.: 15/260,597

(22) Filed: Sep. 9, 2016

(65) Prior Publication Data
US 2017/0077507 A1 Mar. 16, 2017

(30) Foreign Application Priority Data
Sep. 15, 2015 (JP) ................................. 2015-181566

(51) Int. Cl.
*H01M 4/485* (2010.01)
*H02J 7/00* (2006.01)
(Continued)

(52) U.S. Cl.
CPC ............. *H01M 4/485* (2013.01); *B60L 58/21* (2019.02); *H02J 7/0026* (2013.01); *H01M 4/131* (2013.01);
(Continued)

(58) Field of Classification Search
None
See application file for complete search history.

(56) References Cited

U.S. PATENT DOCUMENTS

2009/0253028 A1* 10/2009 Takagi ................ B60L 11/1874
429/62
2012/0328930 A1 12/2012 Inagaki et al.
(Continued)

FOREIGN PATENT DOCUMENTS

CN 103715449 4/2014
CN 104466151 3/2015
(Continued)

OTHER PUBLICATIONS

Nakayama (JP, 2014-078353) (a raw machine translation) (Abstract) (Sep. 10, 2012) (Year: 2012).*
(Continued)

*Primary Examiner* — Carmen V Lyles-Irving
(74) *Attorney, Agent, or Firm* — Oblon, McClelland, Maier & Neustadt, L.L.P.

(57) ABSTRACT

According to one embodiment, there is provided an active material. The active material includes a composite oxide having a monoclinic crystal structure and represented by a general formula of $Li_wNa_{2-x}M1_yTi_{6-z}M2_zO_{13+\delta}$. In the general formula, M1 is at least one metallic element selected from the group consisting of Mg, Sr, Ca, Ba, Cs and K. M2 is at least one metallic element selected from the group consisting of Zr, Sn, V, Nb, Ta, Mo, W, Fe, Co, Mn and Al. The subscript w is within a range of $0 \leq w \leq 6$. The subscript x is within a range of $0 \leq x < 2$. The subscript y is within a range of $0 \leq y < 2$. The subscript z is within a range of $0 < z \leq 6$. The subscript $\delta$ is within a range of $-0.1 \leq \delta \leq 0.1$.

16 Claims, 6 Drawing Sheets

(51) Int. Cl.
*B60L 58/21* (2019.01)
*H01M 4/131* (2010.01)
*H01M 10/0525* (2010.01)

(52) U.S. Cl.
CPC .... *H01M 10/0525* (2013.01); *H01M 2220/20* (2013.01); *Y02E 60/122* (2013.01)

(56) References Cited

U.S. PATENT DOCUMENTS

| | | |
|---|---|---|
| 2013/0320257 A1 | 12/2013 | Nakahara et al. |
| 2014/0099550 A1* | 4/2014 | Nakayama ............ H01M 2/34 429/221 |
| 2014/0147739 A1* | 5/2014 | Nakagawa ............ H01M 4/131 429/188 |

FOREIGN PATENT DOCUMENTS

| | | |
|---|---|---|
| JP | 4237659 B2 | 12/2008 |
| JP | 2009-117259 A | 5/2009 |
| JP | 2010-123424 A | 6/2010 |
| JP | 2013-8493 A | 1/2013 |
| JP | 10-2013-0095135 A | 8/2013 |
| JP | 2013-249223 A | 12/2013 |
| JP | 2014-022041 | 2/2014 |
| JP | 2014-049427 | 3/2014 |
| JP | 2014-078351 | 5/2014 |
| JP | 2014-078352 | 5/2014 |
| JP | 2014-078353 | 5/2014 |
| JP | 2014-103032 A | 6/2014 |

OTHER PUBLICATIONS

Nakayama (JP, 2014-078353) (a raw machine translation) (Detailed Description) (Sep. 10, 2012) (Year: 2012).*

Extended European Search Report dated Jan. 20, 2017 in Patent Application No. 16186962.3.

R. Dominko, et al., "Alkali hexatitanates—$A_2Ti_6O_{13}$(A=Na,K) as host structure for reversible lithium insertion," Journal of Power Sources, vol. 174, (2007); pp. 1172-1176.

R. Dominko, et al., "Reversible lithium insertion into $Na_2Ti_8O_{13}$ structure," Electrochemistry Communications, vol. 8, (2006), pp. 673-677.

Kai Volgmann et al., "Lattice Vibrations to Identify the Li/Na Ratio in $Li_xNa_{2-x}Ti_6O_{13}$(x = 0 . . . 2)," Z. Phys. Chem., (2015), pp. 1-12.

* cited by examiner

ACTIVE MATERIAL, NONAQUEOUS ELECTROLYTE BATTERY, BATTERY PACK AND VEHICLE

CROSS-REFERENCE TO RELATED APPLICATIONS

This application is based upon and claims the benefit of priority from the Japanese Patent Application No. 2015-181566, filed Sep. 15, 2015, the entire contents of which are incorporated herein by reference.

FIELD

Embodiments described herein relate generally to an active material for a battery, a nonaqueous electrolyte battery, a battery pack, and a vehicle.

BACKGROUND

Recently, a nonaqueous electrolyte battery such as a lithium ion secondary battery has been actively researched and developed as a high energy-density battery. The nonaqueous electrolyte battery is expected to be used as a power source for hybrid vehicles, electric cars, an uninterruptible power supply for base stations for portable telephone, or the like. For this, the nonaqueous electrolyte battery is desired to have a high energy density as well as to be excellent in other performances such as rapid charge-and-discharge performances and long-term reliability. For example, a nonaqueous electrolyte battery enabling rapid charge-and-discharge not only remarkably shortens a charging time but also makes it possible to improve performances related to motivity and to efficiently recover a regenerative energy from motivity, in a hybrid vehicle or the like.

In order to enable rapid charge-and-discharge, electrons and lithium ions must be able to migrate rapidly between the positive electrode and the negative electrode. However, when a battery using a carbon-based negative electrode is repeatedly subjected to rapid charge-and-discharge, dendrite precipitation of metal lithium occurs on the electrode, raising the fear as to heat generation and fires caused by internal short circuits.

In light of this, a battery using a metal composite oxide in place of a carbonaceous material in the negative electrode has been developed. Particularly, in a battery using titanium oxide as the negative electrode active material, rapid charge-and-discharge can be stably performed. Such a battery also has a longer life than those using a carbonaceous material.

However, titanium oxide has a higher potential based on metal lithium than the carbonaceous material. That is, titanium oxide is nobler. Furthermore, titanium oxide has a lower capacity per weight. Therefore, a battery using titanium oxide as the negative electrode active material has a problem that the energy density is lower. Particularly, when a material having a high potential based on metal lithium is used as a negative electrode material, a battery using the material has a lower voltage than that of a conventional battery using a carbonaceous material. Therefore, when the battery is used for systems requiring a high voltage such as an electric vehicle and a large-scale electric power storage system, the battery has a problem that the battery series number is increased.

The potential of the electrode using titanium oxide is about 1.5 V based on metal lithium and is higher (nobler) than that of the negative electrode using carbonaceous material. The potential of titanium oxide is due to the oxidation-reduction reaction between $Ti^{3+}$ and $Ti^{4+}$ when lithium is electrochemically inserted and extracted, and is therefore limited electrochemically. It is therefore conventionally difficult to drop the potential of the electrode to improve the energy density.

DETAILED DESCRIPTION

Figure 1:
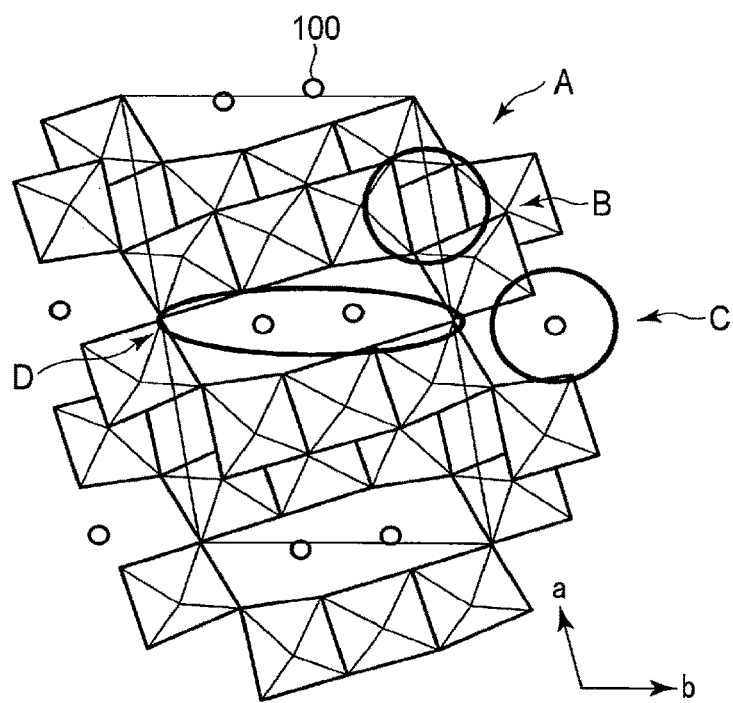
FIG. 1 is a crystal structure view of a composite oxide of $Na_{1.5}Ti_{5.5}Nb_{0.5}O_{13}$, which is one example of a composite oxide having symmetry belonging to a space group C2/m.

In general, according to one embodiment, there is provided an active material. The active material includes a composite oxide having a monoclinic crystal structure and represented by a general formula of $Li_wNa_{2-x}M1_yTi_{6-z}M2_zO_{13+\delta}$. In the general formula, M1 is at least one metallic element selected from the group consisting of Mg, Sr, Ca, Ba, Cs and K. M2 is at least one metallic element selected from the group consisting of Zr, Sn, V, Nb, Ta, Mo, W, Fe, Co, Mn and Al. A value of the subscript w is within a range of $0 \leq w \leq 6$. A value of the subscript x is within a range of $0 \leq x < 2$. A value of the subscript y is within a range of $0 \leq y < 2$. A value of the subscript z is within a range of $0 < z \leq 6$. A value of the subscript $\delta$ is within a range of $-0.1 \leq \delta \leq 0.1$.

According to the embodiment, a nonaqueous electrolyte battery is provided. The nonaqueous electrolyte battery includes a negative electrode including the active material for a battery according to the embodiment, a positive electrode, and a nonaqueous electrolyte.

According to the embodiment, there is provided a battery pack. The battery pack includes the nonaqueous electrolyte battery according to the embodiment.

According to the embodiment, there is provided a vehicle. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, there is provided an active material for a battery. The active material includes a composite oxide having a monoclinic crystal structure and represented by a general formula of $Li_wNa_{2-x}M1_yTi_{6-z}M2_zO_{13+\delta}$. In the general formula, M1 is at least one metallic element selected from the group consisting of Mg, Sr, Ca, Ba, Cs and K. M2 is at least one metallic element selected from the group consisting of Zr, Sn, V, Nb, Ta, Mo, W, Fe, Co, Mn and Al. A value of the subscript w is within a range of $0 \leq w \leq 6$. A value of the subscript x is within a range of $0 \leq x \leq 2$. A value of the subscript y is within a range of $0 \leq y \leq 2$. A value of the subscript z is within a range of $0 \leq z \leq 6$. A value of the subscript $\delta$ is within a range of $-0.1 \leq \delta \leq 0.1$.

First, an active material for a battery according to a first embodiment, including a composite oxide having a monoclinic crystal structure, can realize a nonaqueous electrolyte battery capable of exhibiting a high energy density, for the reason described below.

FIG. 1 shows a crystal structure view of a composite oxide of $Na_{1.5}Ti_{5.5}Nb_{0.5}O_{13}$, which is an example of a composite oxide having a symmetry belonging to a space group of C2/m. In the crystal structure shown in FIG. 1, the smallest spheres 100 show positions of oxide ions.

In the crystal structure shown in FIG. 1, an area A shows a vacancy site having a channel in which lithium ions can three-dimensionally move in the crystal structure. Lithium ions can be inserted into and extracted from the area A.

In the crystal structure shown in FIG. 1, an area B has a polyhedral structure of oxide having a center of Ti or Nb, serving as the backbone of the crystal structure. On the other hand, an area C is a site in which lithium, which can be inserted and extracted, and sodium randomly exist. An area D is a two-dimensional, tunnel-shaped site into which lithium ions can be inserted and in which lithium ions can be diffused.

In the crystal structure shown in FIG. 1, the area A, the area C and the area D, in which lithium can exist, can occupy most of the crystal structure. In addition, these areas are formed by sharing vertexes or edges of the polyhedral structures of the oxide, which have the center of Ti or Nb and serve as the backbone of the crystal structure, with each other, and thus even if lithium ions are inserted, the structure can be stably maintained. The composite oxide of $Na_{1.5}Ti_{5.5}Nb_{0.5}O_{13}$, accordingly, has a insertion space for lithium ions, which is large and structurally stable. For that reason, when the composite oxide of $Na_{1.5}Ti_{5.5}Nb_{0.5}O_{13}$ is used in a nonaqueous electrolyte battery, a high energy density and excellent rapid charge-and-discharge characteristics can be realized. Other composite oxides having the monoclinic crystal structure and represented by the general formula of $Li_wNa_{2-x}M1_yTi_{6-z}M2_zO_{13+\delta}$ can have the same crystal structure as that of the composite oxide of $Na_{1.5}Ti_{5.5}Nb_{0.5}O_{13}$. Therefore, the active material for a battery according to the first embodiment can realize a high energy density.

In addition, the active material for a battery according to the first embodiment can realize a nonaqueous electrolyte battery capable of exhibiting excellent rapid charge-and-discharge characteristics due to the following reason.

Oxygen forming the composite oxide can be negatively charged. The lithium inserted into the composite oxide can exist as lithium ions positively charged. For these reasons, a mutual attraction force may be generated between the oxygen in the composite oxide and the lithium inserted into the composite oxide. If the force is small, an activation energy necessary for moving the Li ions in the solid of the composite oxide is decreased, and thus the Li ions can move faster. The mutual attraction force between the oxygen and the lithium in the composite oxide can be further decreased by further decreasing the amount of oxygen in the composite oxide.

Now, a composite oxide having a monoclinic crystal structure included in the active material for a battery according to the first embodiment has oxygen in an amount of $13+\delta$ mole per 1 mole of the composite oxide, wherein $-0.1 \leq \delta \leq 0.1$. On the other hand, as a compound similar thereto, a composite oxide $Li_{2+x}AT_6O_{14}$ described in Japanese Patent No. 4237659 is exemplified. The compound has oxygen in an amount of 14 mole per 1 mole of the compound. In the composite oxide included in the active material for a battery according to the first embodiment, accordingly, the amount of oxygen included per 1 mole is smaller than that of the composite oxide described in Japanese Patent No. 4237659. For that reason, in the active material for a battery according to the first embodiment, the electric correlation between the Li ion and the oxygen when the Li ions move in the solid can be further decreased compared to the active material for a battery including the composite oxide described in Japanese Patent No. 4237659, and the Li ions can move faster in the solid. As a result, the active material for a battery according to the first embodiment can realize a nonaqueous electrolyte battery capable of exhibiting excellent rapid charge-and-discharge characteristics.

Further, the active material for a battery according to the first embodiment can have an average potential of lithium insertion within a range of 1.0 V to 1.45 V relative to an oxidation-reduction potential of metal lithium (vs. $Li/Li^+$). Therefore, a nonaqueous electrolyte battery using the active material for a battery according to the first embodiment as the negative electrode can exhibit a battery voltage higher than that of a nonaqueous electrolyte battery using a titanium composite oxide whose lithium insertion potential is 1.55 V (vs. $Li/Li^+$) as the negative electrode.

In the active material for a battery according to the first embodiment, a potential can be continuously and gently changed within a potential range of 1.0 V to 1.45 V (vs. $Li/Li^+$) accompanying a change of the state-of-charge.

Figure 2:
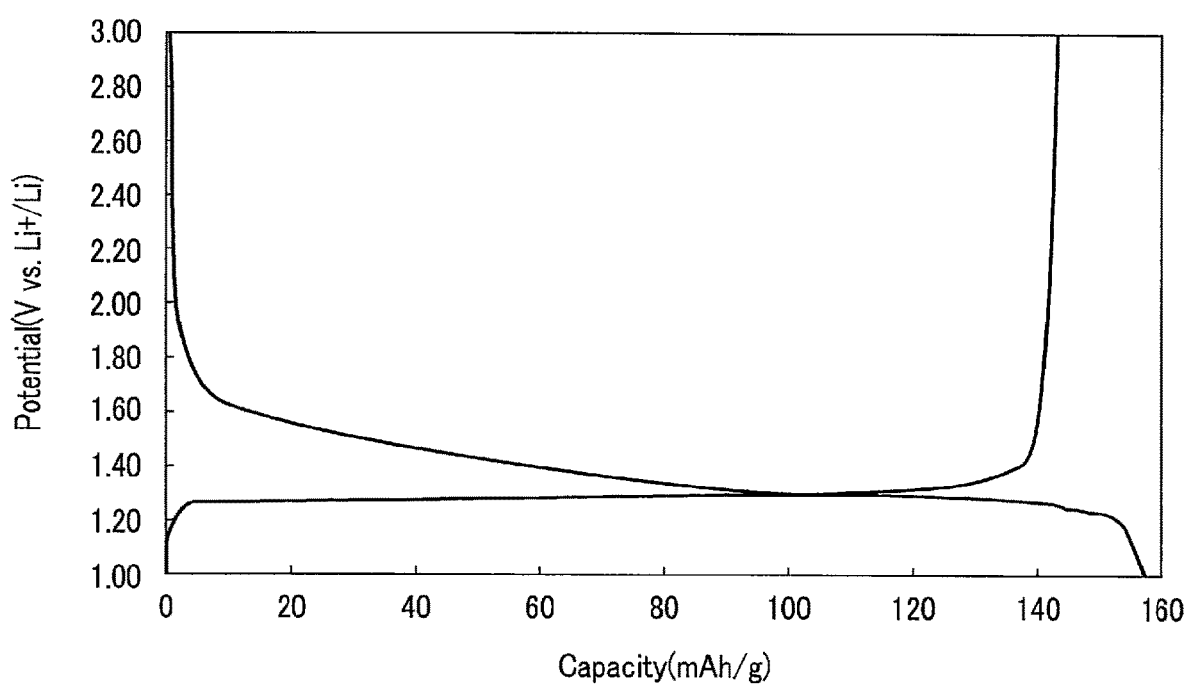
FIG. 2 is a charge-and-discharge curve of a composite oxide of $Na_{1.5}Ti_{5.5}Nb_{0.5}O_{13}$.

Referring to FIG. 2, it is explained by means of an example below that the active material for a battery according to the first embodiment can exhibit a gentle potential change at a high capacity.

FIG. 2 shows a charge-and-discharge curve of the composite oxide of $Na_{1.5}Ti_{5.5}Nb_{0.5}O_{13}$. The composite oxide of $Na_{1.5}Ti_{5.5}Nb_{0.5}O_{13}$ has the monoclinic crystal structure, as shown in FIG. 1, and is a composite oxide which can be included in the active material for a battery according to the first embodiment. For example, this composite oxide of $Na_{1.5}Ti_{5.5}Nb_{0.5}O_{13}$ can be said to be a composite oxide in which, in the crystal structure of the composite oxide of $Na_2Ti_6O_{13}$, a part of Na sites are formed into vacancies and a part of Ti sites are substituted by Nb.

As described in Electrochemistry communications 8 (2006) 673-677, the charge-and-discharge curve of the composite oxide of $Na_2Ti_6O_{13}$ contains a potential step at which the potential is steeply changed accompanying the change of the state-of-charge on a flat part over the potential range of 1.0 V to 1.45 V (vs. $Li/Li^+$). In the nonaqueous electrolyte battery produced using the composite oxide exhibiting such a potential change for the negative electrode, it is difficult to comprehend the correlation between the charge capacity and the battery voltage, and it is difficult to control SOC during the charge-and-discharge. In addition, in such a battery, the battery voltage is suddenly changed during the charge-and-discharge, and thus it has a problem in which an input and output performance is widely varied depending on the state-of-charge.

On the other hand, as shown in FIG. 2, the charge-and-discharge curve of the composite oxide of $Na_{1.5}Ti_{5.5}Nb_{0.5}O_{13}$ can exhibit a continuous potential change having a significant potential gradient. In the nonaqueous electrolyte battery produced using the composite oxide exhibiting such a potential change for the negative electrode, it is easy to comprehend the correlation between the charge-and-discharge capacity and the battery voltage, and thus it is easy to control SOC of the battery. Further, a battery, in which a high input and output performance can be easily maintained independently of the charge-and-discharge state, can be provided.

In the composite oxide which can be included in the active material for a battery according to the first embodiment, the potential can be continuously and gently changed with a significant gradient in a potential range of 1.0 V to 1.45 V (vs. $Li/Li^+$) accompanying a change of the state-of-charge, because the composite oxide can show a high uniformity regarding a coordination environment of oxide ions to the sites into which lithium can be inserted. This is caused because Ti sites or M2 sites and oxide ions form a backbone structure of high covalency, and sites into which lithium can be inserted are formed in gaps in the backbone structure.

On the other hand, when the uniformity of the coordination environment of the oxide ion to the sites into which lithium can be inserted is low, the charge-and-discharge curve of the composite oxide shows a potential step.

For the reasons described above, the active material for a battery according to the first embodiment can realize a nonaqueous electrolyte battery capable of exhibiting a high energy density and excellent rapid charge-and-discharge characteristics and capable of easily controlling the charge-and-discharge state.

The active material for a battery according to the first embodiment is explained in more detailed below.

In the general formula of $Li_wNa_{2-x}M1_yTi_{6-z}M2_zO_{13+\delta}$ for the composite oxide, the subscript w may vary within a range of $0 \leq w \leq 6$ depending on the state-of-charge of the composite oxide. For example, according to a production method explained below, a composite oxide represented by the general formula described above wherein the subscript w is 0 can be produced. When the composite oxide represented by the general formula wherein the subscript w is 0 is incorporated into a nonaqueous electrolyte battery as the negative electrode active material, and the resulting nonaqueous electrolyte battery is charged, the subscript w is increased to a value of more than 0 to 6. Alternatively, for example, a composite oxide can also be synthesized in a composition ratio of starting materials so that a w value in the formula, which is an amount of Li, is within a range of more than 0 to 6 before the initial charge, according to a method explained below. The active material for a battery including the composite oxide in the state in which the Li amount, w, is more than 0 to 6 before the initial charge can suppress the trapping of lithium ions in the structure thereof at the time of the initial charge-and-discharge, thus resulting in an improved initial charge-and-discharge efficiency.

In the general formula of $Li_wNa_{2-x}M1_yTi_{6-z}M2_zO_{13+\delta}$ for the composite oxide, the subscript x corresponds to an amount of Na in the crystal structure of the composite oxide; in other words, the amount of Na in the crystal structure can be changed by changing the value of x. An average operating potential of an electrode can be controlled within a range of 1.0 V to 1.5 V relative to an oxidation-reduction potential of metal lithium (vs. $Li/Li^+$) depending on the amount of Na in the crystal structure, whereby an operating potential of the electrode can be easily designed.

The value of the subscript x is within a range of $0 \leq x < 2$, preferably $0.1 \leq x \leq 1.5$, more preferably $0.25 \leq x \leq 0.75$.

In the general formula of $Li_wNa_{2-x}M1_yTi_{6-z}M2_zO_{13+\delta}$ for the composite oxide, the subscript y corresponds to an amount of element M1 contained in the crystal structure of the composite oxide represented by this general formula. The subscript y is within a range of $0 \leq y < 2$. The subscript y is preferably within a range of $0 \leq y \leq 1$, more preferably 0. The composite oxide represented by the general formula of $Li_wNa_{2-x}M1_yTi_{6-z}M2_zO_{13+\delta}$, accordingly, may not contain the element M1. The composite oxide containing no element M1 can be represented by the general formula of $Li_wNa_{2-x}Ti_{6-z}M2_zO_{13+\delta}$.

The element M1 is at least one metallic element selected from the group consisting of Mg, Sr, Ca, Ba, Cs and K. The metallic element M1 can be one metallic element selected from the group consisting of Mg, Sr, Ca, Ba, Cs and K. Alternatively, the metallic element M1 can include two or more metallic elements selected from the group consisting of Mg, Sr, Ca, Ba, Cs and K. When a bivalent element such as Mg, Sr, Ca, or Ba is included as the element M1, correlation with the oxide ion is increased, and as a result, the correlation between Li and the oxide ion is decreased, whereby, preferably, Li ions can easily move in the crystal structure. Elements of Cs and K have a larger ion radius than that of Na, and expand the crystal lattice, and thus Li ions can easily move in the crystal structure.

It is also preferable that the value of the subscript x is larger than that of the subscript y. In this case, the monoclinic composite oxide, included in the active material for a battery according to the first embodiment, can contain further vacancy sites which can act as a site into which Li ions are inserted. The monoclinic composite oxide containing the further vacancy sites can realize a higher charge-and-discharge capacity.

In the general formula of $Li_wNa_{2-x}M1_yTi_{6-z}M2_zO_{13+\delta}$ for the composite oxide, the subscript z corresponds to an amount of metallic element M2 included in the crystal structure of the composite oxide represented by this general formula. The subscript z is within a range of $0 < z \leq 6$, preferably $0.1 \leq z \leq 0.9$, more preferably $0.25 \leq z \leq 0.75$.

The metallic element M2 is at least one element selected from the group consisting of Zr, Sn, V, Nb, Ta, Mo, W, Fe, Co, Mn and Al. The metallic element M2 can be one metallic element selected from the group consisting of Zr, Sn, V, Nb, Ta, Mo, W, Fe, Co, Mn and Al. Alternatively, the metallic element M2 can include two or more metallic elements selected from the group consisting of Zr, Sn, V, Nb, Ta, Mo, W, Fe, Co, Mn and Al.

In a more preferable aspect, the metallic element M2 includes Nb and/or Ta. Nb can be subjected to a bivalent reduction from pentavalent Nb to trivalent Nb. For this reason, in a composite oxide including Nb as the metallic element M2, the amount of lithium inserted in the composite oxide can be increased compared to a composite oxide including only Ti, which can be subjected to a monovalent reduction from tetravalent Ti to trivalent Ti as the metallic element other than Li, Na and Ni. In addition, an oxidation-reduction potential of Nb relative to metal lithium when Li is inserted is continuously and gently changed in a wide range of 1.5 V (vs. Li/Li$^+$) to 1.0 V (vs. Li/Li$^+$). For this reason, in the active material for a battery according to the preferable aspect, the potential change accompanying the change of the state-of-charge becomes further continuous and gentle, it is more easy to comprehend the correlation between the charge-and-discharge potential and the state-of-charge, and it is more easy to control the state-of-charge of a battery.

Tantalum Ta can exhibit chemical and physical properties similar to those of niobium Nb, but is different in the oxidation-reduction potential from niobium Nb. In an aspect in which the metallic element M2 includes Ta, the increased correlation between the oxide ion and Ta is established in the backbone structure, and thus there is an effect of easily moving lithium in the composite oxide. For that reason, in the aspect in which the metallic element M2 includes Ta, rapid charge-and-discharge of the composite oxide can be performed.

It is more preferable that the metallic element M2 includes Nb. A composite oxide included in the active material for a battery according to the first embodiment in the more preferable aspect is represented by the general formula of $Li_wNa_{2-x}Ti_{6-z}Nb_zO_{13+\delta}$.

In another preferable aspect, the metallic element M2 includes at least one element selected from the group consisting of Fe, Mn, and Co. A composite oxide included in the active material for a battery according to this aspect can exhibit an excellent electronic conductivity. As a result, a nonaqueous electrolyte battery, produced using the active material for a battery according to this aspect, can exhibit excellent rate characteristics and an excellent life-time property.

In another preferable aspect, the metallic element M2 includes Mo or V. A composite oxide included in the active material for a battery according to this aspect can show a low melting point. Such a compound can be synthesized with an excellent crystallinity by sintering. The active material for a battery including the compound having an excellent crystallinity can realize a nonaqueous electrolyte battery capable of exhibiting excellent rate characteristics and an excellent life property.

In another preferable aspect, the metallic element M2 includes Zr, W or Al. A composite oxide included in the active material for a battery according to this aspect includes Zr, W or Al, which are electrochemically inert, in the backbone structure. Such a compound can stabilize the crystallinity during the charge-and-discharge.

In a further other preferable aspect, the metallic element M2 includes Sn. A composite oxide included in the active material for a battery according to this aspect is easily oxidized and reduced at a potential lower than that of Ti relative to metal lithium. In such a compound, the oxidation-reduction potential relative to metal lithium is less than 1.5 V (vs. Li/Li$^+$) during the charge-and-discharge, and thus the energy density of a battery can be increased.

In the general formula of $Li_wNa_{2-x}M1_yTi_{6-z}M2_zO_{13+\delta}$ for the composite oxide, the subscript δ can vary within a range of $-0.1 \le \delta \le 0.1$ depending on the oxygen deficiency of the composite oxide represented by this general formula or the amount of the oxygen inevitably mixed during the production process of the active material for a battery. The value of the subscript δ is preferably within a range of $-0.05 \le \delta \le 0.01$.

The monoclinic composite oxide included in the active material for a battery according to the first embodiment can be a substituted composite oxide from the composite oxide having the monoclinic crystal structure represented by the general formula of $Li_wNa_2Ti_6O_{13+\delta}$. Specifically, the monoclinic composite oxide of $Li_wNa_{2-x}M1_yTi_{6-z}M2_zO_{13+\delta}$ can be a substituted composite oxide in which, in a monoclinic crystal structure of the composite oxide represented by the general formula of $Li_wNa_2Ti_6O_{13+\delta}$, a portion of Na is substituted by the metallic element M1 and/or Na is removed from a portion of the Na sites to create a vacancy, and in which at least a part of Ti is substituted by the metallic element M2.

When the composite oxide included in the active material for a battery according to the first embodiment is such a substituted composite oxide, the subscript x in the general formula of $Li_wNa_{2-x}M1_yTi_{6-z}M2_zO_{13+\delta}$ can be an index indicating a ratio of portions substituted by the elements M1 or vacancy sites in the substituted composite oxide, among sites corresponding to the Na sites in the monoclinic composite oxide of $Li_wNa_2Ti_6O_{13+\delta}$. From another viewpoint, the subscript x can be an index indicating an amount of Na removed from Na sites in the crystal structure of the composite oxide represented by the monoclinic composite oxide of $Li_wNa_2Ti_6O_{13+\delta}$. The subscript y in the general formula described above can be an index indicating a ratio of portions substituted by the elements M1 in the substituted composite oxide, among sites corresponding to the Na sites in the composite oxide of $Li_wNa_2Ti_6O_{13+\delta}$. The combination of the subscript x and the subscript y, accordingly, can be an index indicating a ratio of portions substituted by the metallic elements M1 in the substituted composite oxide, among sites corresponding to the Na sites in the composite oxide $Li_wNa_2Ti_6O_{13+\delta}$.

When the composite oxide included in the active material for a battery according to the first embodiment is such a substituted composite oxide, the subscript z in the general formula of $Li_wNa_{2-x}M1_yTi_{6-z}M2_zO_{13+\delta}$ can be an index indicating a ratio of portions substituted by the metallic element M2 in the substituted composite oxide, among sites corresponding to Ti sites in the monoclinic composite oxide of $Li_wNa_2Ti_6O_{13+\delta}$.

When the composite oxide included in the active material for a battery according to the first embodiment is such a substituted composite oxide, it is preferable that the value of the subscript x is larger than that of the subscript y. In this case, the monoclinic composite oxide included in the active material for a battery according to the first embodiment can contain further vacancy sites which can act as host sites for Li ions, as described above. With respect to these vacancy sites, it can be considered that a part of Na sites in the monoclinic crystal structure of the composite oxide represented by a formula of $Li_wNa_2Ti_6O_{13+\delta}$ are turned into void sites capable of acting as hosts for the Li ions. By the formation of such vacancy sites, the energy density per unit weight or unit volume can be increased while a lattice volume in which lithium ions can be easily inserted and extracted is maintained. Further, Li ions can be more easily inserted into and extracted from the substituted composite oxide containing these vacancy sites than the composite oxide represented by the general formula of $Li_wNa_2Ti_6O_{13+\delta}$; as a result, it can realize a higher charge-and-discharge capacity. In addition, an average operating potential of an electrode can be changed by changing an amount of Na, whereby a potential of a battery can be easily designed.

In particular, when the composite oxide included in the active material for a battery according to the first embodiment is the substituted composite oxide described as above, and the value of the subscript y is 0, this composite oxide can have a crystal structure including a portion of the sites corresponding to the Na sites in the composite oxide of $Li_wNa_2Ti_6O_{13+\delta}$ as vacancy sites, wherein a ratio of the portion of the site is indicated by the subscript x; in other words, the sites corresponding to the Na sites in the composite oxide $Li_wNa_2Ti_6O_{13+\delta}$, may not be substituted by the metallic element M1, but further vacancies may be formed instead.

The monoclinic composite oxide included in the active material for a battery according to the first embodiment can maintain the electrical neutrality of the crystal structure. That is, in the composite oxide included in the active material for a battery according to the first embodiment, the total of valencies of elements capable of having positive charges and the total of valencies of elements capable of having negative charges can be made equal as absolute values. A state in which positive charges and negative charges are equal as absolute values in the composite oxide included in the active material for a battery according to the first embodiment will be described in detail below.

First, in the composite oxide of $Li_wNa_{2-x}M1_yTi_{6-z}M2_zO_{13+\delta}$ included in the active material for a battery according to the first embodiment, Li and Na can exist in a monovalent state.

In addition, Mg, Sr, Ca and Ba, which can be the metallic element M1 in the composite oxide of $Li_wNa_{2-x}M1_yTi_{6-z}M2_zO_{13+\delta}$, can exist in a bivalent state. Further, Cs and K, which can be the metallic element M1 in the composite oxide of $Li_wNa_{2-x}M1_yTi_{6-z}M2_zO_{13+\delta}$, can exist as a monovalent state.

The valence of Ti and the metallic element M2 in the composite oxide of $Li_wNa_{2-x}M1_yTi_{6-z}M2_zO_{13+\delta}$ can respectively depend on the state-of-charge of this composite oxide, i.e., the amount w of Li inserted. Here, taking a case where the composite oxide of $Li_wNa_{2-x}M1_yTi_{6-z}M2_zO_{13+\delta}$ is in a non-charged state as an example, the valence of Ti and the metallic element M2 are explained. In the composite oxide in the non-charged state, the value of the subscript w in the general formula is 0. The composite oxide in the non-charged state, accordingly, can be represented by the general formula of $Na_{2-x}M1_yTi_{6-z}M2_zO_{13+\delta}$.

In the composite oxide of $Na_{2-x}M1_yTi_{6-z}M2_zO_{13+\delta}$ in the non-charged state, Ti can exist in a tetravalent state. With respect to the element which can be the metallic element M2, in the composite oxide $Na_{2-x}M1_yTi_{6-z}M2_zO_{13+\delta}$ in the non-charged state, Fe, Co, Mn, and Al can exist in a trivalent state, Zr and Sn can exist in a tetravalent state, V, Nb and Ta can exist in a pentavalent state, and Mo and W can exist in a hexavalent state.

Collectively, the valence of the element capable of having a positive charge in the composite oxide of $Na_{2-x}M1_yTi_{6-z}M2_zO_{13+\delta}$ in the non-charged state is as follows: The total valence of Na is $(2-x)$. The total valence of the element M1 is the total: $(y_1 \times 1)+(y_2 \times 2)$ wherein $y_1+y_2=y$, when one mole of the composite oxide includes $y_1$ mole of a monovalent metallic element $M1_1$ and $y_2$ mole of a bivalent metallic element $M1_2$. The total valence of Ti is $4\times(6-z)$. The total valence of the metallic element M2 is that the total: $(z_3 \times 3)+(z_4 \times 4)+(z_5 \times 5)+(z_6 \times 6)$ wherein $z_3+z_4+z_5+z_6=z$, when one mole of the composite oxide includes $z_3$ mole of a trivalent metallic element $M2_3$, $z_4$ mole of a tetravalent metallic element $M2_4$, $z_5$ mole of a pentavalent metallic element $M2_5$, and $z_6$ mole of a hexavalent metallic element $M2_6$.

On the other hand, the composite oxide includes oxygen as an element capable of having a negative charge. Oxygen can exist in a negative bivalent state in this composite oxide. The total valence of the oxygen in the composite oxide of $Na_{2-x}M1_yTi_{6-z}M2_zO_{13+\delta}$, accordingly, can be $(-2)\times(13+\delta)$. Here, the subscript $\delta$ can take a value within a range of −0.1 to 0.1. The state in which $\delta$ is beyond the range of −0.1≤δ≤0.1 is not preferable, because the oxidation reduction state of the Ti and the metallic element M2 bay be outside of a stable state, or a lattice defect such as oxygen deficiency may possibly be caused, and the desired crystal phase cannot be obtained, thus resulting in decreased battery characteristics.

Here, in the monoclinic composite oxide included in the active material for a battery according to the first embodiment, assuming that the Ti and the metallic element M2 are in a stably oxidized state, and the oxygen exists in a proper amount, then δ=0, and thus the total valence of the oxygen is −2×13, i.e., −26. In this case, a state in which the absolute value of the total valence of the elements capable of having a positive charge coincides with the absolute value of the total valence of the oxygen can be shown by the following formula (1):

$$(2-x)+(y_1 \times 1)+(y_2 \times 2)+\{4 \times (6-z)\}+\{(z_3 \times 3)+(z_4 \times 4)+(z_5 \times 5)+(z_6 \times 6)\}-26=0 \quad (1)$$

The formula (1) can be rearranged into the following formula (2):

$$-x+y+y_2-4z+(3z_3+4z_4+5z_5+6z_6)=0 \quad (2)$$

Accordingly, when the condition of the formula (2) is satisfied, the monoclinic composite oxide included in the active material for a battery according to the first embodiment can maintain an electrical neutrality in the crystal structure.

Also, as described above, in the monoclinic composite oxide included in the active material for a battery according to the first embodiment, the total valence of the oxygen can be $(-2)\times(13+\delta)$. Even if the total valence of the elements capable of having a positive charge varies within a range of +26±0.2, relative to the total valence of the oxygen which exists in the proper amount of −28, the same effects can be obtained.

Further, in a case of w>0 in the composite oxide included in the active material for a battery according to the first embodiment, i.e., Li is inserted, the valence of the Ti and the element M2 is smaller than the valence described above, i.e., the Ti and the element M2 are reduced to maintain a charge neutrality. In the composite oxide included in the active material for a battery according to the first embodiment, accordingly, even if the value of the subscript w varies within a range of 0 to 6, electrical neutrality can be maintained.

For example, the monoclinic composite oxide of $Li_wNa_{2-x}M1_yTi_{6-z}M2_zO_{13+\delta}$, satisfying the formula (2) can be a substituted composite oxide from the monoclinic composite oxide $Li_wNa_2Ti_6O_{13+\delta}$, as described above. The monoclinic composite oxide of $Li_wNa_2Ti_6O_{13+\delta}$ can be electrically neutral. In such a composite oxide of $Li_wNa_2Ti_6O_{13+\delta}$, if Na removed from a part of the Na sites to form vacancy sites, the total valence of the elements capable of having a positive charge is decreased in the composite oxide. Specifically, if x mole of Na is removed from 1 mole of the composite oxide of $Li_wNa_2Ti_6O_{13+\delta}$ to form x mole of vacancy sites, the total positive valence in this composite oxide is decreased by x. At that time, for example, if Li is inserted in the vacancies formed or the metallic element M1 is substituted, or a part of the Ti sites in the composite oxide of $Li_wNa_2Ti_6O_{13+\delta}$ is substituted by the pentavalent element $M2_5$ or the hexavalent element $M2_6$, which are the metallic element M2, so that the decreased valence x is compensated, electrical neutrality can be maintained.

By the substitution described above, while the crystal structure of the composite oxide of $Li_wNa_2Ti_6O_{13+\delta}$ is maintained, an amount of Na, which is an obstacle to lithium ion conduction, can be decreased and vacancy sites, which can be host sites of Li, can be increased. In addition, such vacancy sites can exist stably, whereby a substituted composite oxide capable of realizing an improved charge-and-discharge capacity and an excellent life-time property can be obtained.

In particular, in the substituted composite oxide in which a part of the Na sites in the composite oxide of $Li_wNa_2Ti_6O_{13+\delta}$ is replaced by the stable vacancy, electric repulsion of the sites which can be hosts for Li ions is decreased, and thus a higher reversible capacity can be realized.

In the composite oxide $Li_wNa_4Ti_6O_{14+\delta}$, when a part of the Ti sites is substituted by the trivalent metallic element $M2_3$ alone, the charge decrease due to a decrease of Na amount cannot be compensated. For that reason, it is preferable that the substitution is carried out with a pentavalent or hexavalent metallic element. Further, even in the substitution described above, the amount of Na, which is an obstacle to lithium ion conduction, can be decreased while the crystal structure of the composite oxide of $Li_wNa_2Ti_6O_{13+\delta}$ is maintained.

In the general formula of $Li_wNa_{2-x}M1_yTi_{6-z}M2_zO_{13+\delta}$, accordingly, as the subscripts w, x, y ($y_1$ and $y_2$), z ($z_3$, $z_4$, $z_5$ and $z_6$) and $\delta$, values within the specific ranges described above can be taken, but it is preferable that they are selected so that the formula (2) described above is satisfied.

When the composite oxide included in the active material for a battery according to the first embodiment is the substituted composite oxide from the monoclinic composite oxide of $Li_wNa_2Ti_6O_{13+\delta}$, includes the element M1, and satisfies the formula (2), it can be said that a part of Na sites in the crystal structure of the composite oxide represented by the general formula of $Li_wNa_2Ti_6O_{13+\delta}$ are properly substituted by the element M1. When the composite oxide included in the active material for a battery according to the first embodiment is a substituted composite oxide from the monoclinic composite oxide of $Li_wNa_2Ti_6O_{13+\delta}$, and satisfies the formula (2), it can be said that a part of the Ti sites in the crystal structure of the composite oxide represented by the general formula of $Li_wNa_2Ti_6O_{13+\delta}$ are properly substituted by the metallic element M2.

In the active material for a battery according to the first embodiment, which includes the substituted composite oxide of $Li_wNa_{2-x}M1_yTi_{6-z}M2_zO_{13+\delta}$ satisfying the formula (2), the coordination environment of the oxide ion to the space site into which the lithium ions are inserted can be made uniform.

In a particularly preferable aspect, the metallic element M2 includes Nb and the value of the subscript y is 0. The composite oxide included in the active material for a battery according to the first embodiment of the particularly preferable aspect, accordingly, can be represented by the general formula of $Li_wNa_{2-x}Ti_{6-z}Nb_zO_{13+\delta}$. As described above, Nb can be subjected to a divalent reduction from pentavalent Nb to trivalent Nb. In the composite oxide of $Li_wNa_{2-x}Ti_6O_{13+\delta}$, accordingly, when at least a part of Ti ions, which can be subjected to a monovalent reduction from tetravalent Ti to trivalent Ti, is substituted by Nb, the amount of lithium inserted can be increased in the monoclinic composite oxide. As also described above, the oxidation-reduction potential relative to metal lithium of Nb when Li is inserted is continuously and gently changed in a wide range of 1.5 V to 1.0 V. For that reason, in the active material for a battery according to the preferable aspect, the potential change accompanying the change of the state-of-charge becomes further continuous and gentle, it can be more easy to comprehend the correlation between the charge-and-discharge potential and the state-of-charge, and it can be more easy to control the state-of-charge of a battery. And then, when a part of Na sites in the monoclinic composite oxide of $Li_wNa_2Ti_6O_{13+\delta}$ are formed into vacancy sites, the amount of lithium to be inserted can be further increased in the monoclinic composite oxide.

The active material for a battery according to the first embodiment may include a composite oxide having a crystal structure having symmetry belonging to a space group other than the space group of C2/m shown in FIG. 1 as an example. For example, the active material for a battery according to the first embodiment can include a composite oxide having a crystal structure having symmetry belonging to a space group similar to the symmetry of the space group of C2/m. Specific examples of a symmetry similar to the symmetry of the space group of C2/m may include Cmca, F222, Pmcm, Pmma, Cmma, and the like. Alternatively, the active material for a battery according to the first embodiment may include a composite oxide having a crystal structure in which a crystal phase having symmetry other than the space group of C2/m is mixed. In the aspects having any crystal structure described above, due to the reasons described above, the active material for a battery according to the first embodiment can show a high energy density and excellent rapid charge-and-discharge characteristics, and can realize a nonaqueous electrolyte battery capable of easily controlling the charge-and-discharge state.

The symmetry of the crystal structure of the composite oxide can be examined from an X-ray diffraction view, obtained by a powder X-ray diffraction method using a Cu-Kµ ray for the composite oxide.

In addition, from the X-ray diffraction view obtained by the powder X-ray diffraction method using the Cu-K$\alpha$ ray, the lattice volume of the crystal structure of the composite oxide can be examined. The monoclinic composite oxide included in the active material for a battery according to the first embodiment has preferably a volume of a unit crystal lattice of 519 $Å^3$ to 900 $Å^3$, more preferably 519 $Å^3$ to 600 $Å^3$. When the volume is 519 $Å^3$ or more, spaces in which Li easily move can be obtained, and when the volume is 600 $Å^3$ or more, it is difficult for Li ions to be unevenly distributed in the structure, which is preferably.

The composite oxide included in the active material for a battery according to the first embodiment may be in a particle form, for example. The average particle size of the composite oxide included in the active material for a battery according to the first embodiment is not particularly limited, and can be changed according to desired battery characteristics.

The active material for a battery according to the first embodiment preferably includes the above composite oxide particles and a conductive substance such as carbon with which the surface of particles is covered. The active material for a battery of such a preferable aspect can exhibit an improved rapid charge-discharge performance. Since the insertion and extraction of lithium may occur via a homogeneous solid state reaction in the composite oxide, the composite oxide has a property that electrical conductivity is increased according as the inserted amount of lithium increases. In the composite oxide, a region where the amount of lithium inserted is low has relatively low electrical conductivity. Therefore, an excellent rapid-charge-and-discharge performance can be obtained, regardless of the inserted amount of lithium, by previously covering the surface of composite oxide particles with a conductive substance such as carbon.

Alternatively, by covering the surface of the composite oxide particles with lithium titanate, which exhibits electrical conductivity in a state where lithium is inserted into the crystal structure thereof, in place of the conductive substance such as carbon, the same effect can be obtained. In addition, since lithium titanate with which the surface of the composite oxide particles is covered exhibit an insulation property by the extract of lithium when the battery is internally short-circuited, the lithium titanate can exhibit excellent safety.

<BET Specific Surface Area>

The BET specific surface area of the composite oxide included in the active material for a battery according to the first embodiment is not particularly limited, and is preferably 5 m$^2$/g or more and less than 200 m$^2$/g. The BET specific surface area is more preferably 5 to 30 m$^2$/g.

When the BET specific surface area is 5 m$^2$/g or more, the contact area with the electrolytic solution can be secured. Thus, good discharge rate performances can be easily obtained and also, a charge time can be shortened. On the other hand, when the BET specific surface area is less than 200 m$^2$/g, reactivity with the electrolytic solution can be prevented from being too high and therefore, the life performance can be improved. When the BET specific surface area is 30 m$^2$/g or less, side reactions with the electrolytic solution can be suppressed, and thereby longer life can be further expected. And, in this case, a coatability of a slurry containing the active material for a battery in the production of an electrode, which will be described later, can be improved.

Here, as the measurement of the specific surface area, a method is used, the method including allowing molecules of which an occupied area in adsorption is known to be adsorbed onto the surface of powder particles at the temperature of liquid nitrogen and determining the specific surface area of the sample from the amount of adsorbed molecules. The most frequently used method is a BET method based on the low temperature/low humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

<Production Method>

The active material for a battery according to the first embodiment can be synthesized, for example, by a solid phase reaction as described below.

First, raw materials, such as oxide, compound, and a salt, are mixed in a proper stoichiometric ratio to obtain a mixture. The salts are preferably salts capable of decomposing at a comparatively low temperature to generate an oxide, such as carbonates and nitrates. Next, the obtained mixture is ground and mixed as uniformly as possible. Subsequently, the resulting mixture is calcinated. The calcination is performed at a temperature range of 600° C. to 850° C. in an air atmosphere for a total of 1 to 3 hours. Next, the firing temperature is increased and the main-sintering is performed at 900° C. to 1500° C. in the atmosphere. At that time, the lithium, which is a light element, may be vaporized by firing it at a temperature of 900° C. or higher. In such a case, a vaporized amount of lithium in the firing conditions is checked, and the vaporized amount checked up is compensated for by providing a raw material containing lithium in an excess amount to obtain a sample having a proper composition. Furthermore, it is more preferable to prevent a lattice defect due to oxygen deficiency or the like. For example, the raw material powder is subjected to pressure molding to pellets or rods before the main-sintering to decrease an area brought into contact with the air atmosphere and to increase the contact surface between particles. When a material in this state is sintering, the generation of the lattice defect can be suppressed. In a case of industrial mass production, it is preferable that when the raw material powder is sintering, the sintering is performed under a high oxygen partial pressure such as an oxygen atmosphere, or after the usual air atmosphere sintering, a heat treatment (annealing) is performed at a temperature range of 400° C. to 1000° C. to restore the oxygen deficiency. If the generation of the lattice defect is not suppressed, the crystallinity may possibly be reduced.

When the synthesis is performed as described above, as explained above, for example, the composite oxide of the general formula wherein the subscript w is 0 can be produced. When the composite oxide in which the subscript w is 0 is incorporated into the nonaqueous electrolyte battery as the negative electrode active material, and the resulting nonaqueous electrolyte battery is charged, a state in which the Li amount w in the formula is increased to a range of more than 0 to 6 is formed. Alternatively, when a lithium source such as lithium carbonate is used as the starting material, and the composite oxide is synthesized so that a starting material composition ratio is adjusted to the value of w within a range of more than 0 to 6, the composite oxide can be synthesized in the state in which the value of w is within a range of more than 0 to 6. In addition, the composite oxide in the state in which the value of w is within a range of more than 0 to 6 can also be obtained by immersing the composite oxide in an aqueous lithium hydroxide solution, or the like, after the composite oxide is synthesized.

Next, a method for obtaining the X-ray diffraction diagram of the composite oxide according to the powder X-ray diffraction, and a method for confirming the composition of the composite oxide will be described.

When an active material to be measured is contained in an electrode material of a nonaqueous electrolyte battery, a pre-treatment is performed as described below.

First, a state in which lithium ions are completely removed from the crystals of the active material is made. When the active material to be measured is contained in the negative electrode, the battery is made to be in a completely discharged state. However, there are remaining lithium ions even if in the discharged state, but the existence thereof does not greatly affect the measurement results of the powder X-ray diffraction described below.

Should be noted that the state in which the battery is completely discharged refers to a state in which mobile Li ions in the compound have been extracted by holding the electrode containing the compound at a potential of +3.0 V relative to the metal lithium potential for one or more hours. Specifically, in order to obtain a completely discharged state, the battery described above is disassembled in a dry argon gas atmosphere, and then the electrode containing the compound is taken out. Using the electrode as a working electrode and metal lithium as the counter electrode and the reference electrode, a three pole half-cell is manufactured. In this case, the electrode acts as the positive electrode relative to the metal lithium negative electrode. This half-cell is put in a charge-and-discharge apparatus, and current is applied in a charge direction (a direction for extracting Li from the electrode) until the cell potential reaches 3.0 V. The resulting half-battery is kept in this state for a further one or more hours to extract the Li ions from the electrode containing the compound. Thus, the active material can be made into a completely discharged state.

Next, the battery is disassembled in a glove box filled with argon to take out an electrode. The taken-out electrode is washed with an appropriate solvent and dried under a reduced pressure. For example, ethyl methyl carbonate may be used. After washing and drying, whether or not there are white precipitates such as a lithium salt on the surface is checked.

When the powder X-ray diffraction measurement is performed, the washed electrode is cut into a size having the same area as that of a holder in the powder X-ray diffraction apparatus, for used as a measurement sample.

When a composition analysis is performed, the active material is taken out from the washed electrode, and the taken-out active material is analyzed, as described later.

<Method for Obtaining X-Ray Diffraction Diagram of Composite Oxide according to Powder X-Ray Diffraction>

The powder X-ray diffraction measurement of the active material is performed as follows:

First, the target sample is ground until an average particle size reaches about 5 μm. Even if the original average particle size is less than 5 μm, it is preferable that the sample is subjected to a grinding treatment with a mortar for grinding aggregates. The average particle size can be obtained by laser diffraction. The ground sample is filled in a holder part having a depth of 0.5 mm, formed on a glass sample plate. A glass sample plate manufactured by Rigaku Corporation is used as the glass sample plate. At this time, much care is necessary to fill the holder part fully with the sample. Special care should be taken to avoid cracking and formation of voids caused by insufficient filling of the sample. Then, another glass plate is used to smooth the surface of the sample by sufficiently pressing the glass plate against the sample. At that time, much care should be taken to avoid too much or too little amount of the sample to be filled, so as to prevent any rises and dents in the basic plane of the glass holder. Then, the glass plate filled with the sample is set in a powder X-ray diffractometer. And then, a diffraction pattern [XRD (X-ray diffraction) pattern] is obtained by using Cu-Kα rays.

In the case where an orientation in which crystal planes are arranged in a specific direction according to the shapes of particles is observed from the results of the Rietveld analysis, there is the possibility of deviation of peak position and variation in an intensity ratio, depending on the way of filling the sample when the glass plate is filled with the sample. Such a sample having high orientation is measured using a capillary (cylindrical glass narrow tube). Specifically, the sample is inserted into the capillary, which is then mounted on a rotary sample table to measure while being rotated. Such a measuring method can provide the result of reducing the influence of orientation.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5° \leq 2\theta \leq 90°$. When another apparatus is used, measurement using a standard Si powder for powder X-ray diffraction is performed under conditions where a peak intensity and a peak top position correspond to those by obtained using the above apparatus so as to obtain measurement results equivalent to those described above.

The x-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, and crystal site occupancy ratio or the like) can be precisely analyzed by fitting all the calculated values and measurement values. Thereby, the characteristics of the crystal structure of the synthesized composite oxide can be determined. The site occupancy ratio of constitutional elements in each of the sites can be determined. A fitting parameter S is used as the scale for estimating the degree of agreement between the measured reflection patterns and the calculated patterns in the Rietveld analysis. The S value must be less than 1.8 in the analysis. When determining the occupancies in each of the sites, the standard deviation $\sigma_j$ must be taken into consideration. The fitting parameter S and standard deviation $\sigma_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

By the above method, information about the crystal structure of the active material for a battery to be measured can be obtained. For example, when the active material for a battery according to the first embodiment is measured as described above, the active material to be measured is found to have a composite oxide having a monoclinic structure. The symmetry of the crystal structure to be measured, such as space group C2/m, can be examined, for example, by measuring as described above.

When the active material to be measured is contained in the electrode material of the nonaqueous electrolyte battery, first, the electrode is taken out from the nonaqueous electrolyte battery according to the previously described procedure. The taken-out and washed electrode is cut to the size almost equal to the area of the holder of a powder X-ray diffractometer, and used as the measurement sample.

The obtained measurement sample is affixed directly to the glass holder, and measured. In this case, the position of the peak originated from the electrode substrate such as a metal foil is previously measured. The peaks of other components such as a conductive agent and a binder are also previously measured. When the peaks of the substrate and active material overlap to each other, it is desirable that the layer including the active material (e.g., the below-described active material layer) is separated from the substrate, and subjected to measurement. This is a process for separating the overlapping peaks when the peak intensity is quantitatively measured. For example, the active material layer can be separated by irradiating the electrode substrate with an ultrasonic wave in a solvent. The active material layer is inserted into the capillary, mounted on the rotary sample table, and measured. As a result of this process, the XRD pattern of the active material can be obtained with the influence of the orientation reduced.

<Method for Confirming Composition of Composite Oxide>

The composition of the active material for a battery can be analyzed using Inductively Coupled Plasma (ICP) emission spectroscopy, for example. At that time, the abundance ratios of elements depend on the sensitivity of an analyzing device to be used. Therefore, when the composition of the active material for a battery as an example according to the first embodiment is analyzed, for example, using ICP emission spectroscopy, the numerical values may deviate due to errors of the measuring device from the previously described element ratios. However, even if the measurement results deviate as described above in the error range of the analyzing device, the active material for a battery as an example according to the first embodiment can sufficiently exhibit the previously described effects.

In order to measure the composition of the active material for a battery included in the battery according to ICP emission spectroscopy, the following procedure is specifically performed. First, according to the previously described procedure, an electrode including an active material to be measured is taken out from a nonaqueous electrolyte battery, and washed. The washed electrode is put in a suitable solvent, and irradiated with an ultrasonic wave. For example, an electrode is put into ethyl methyl carbonate in a glass beaker and the glass beaker is vibrated in an ultrasonic washing machine, and thereby an electrode layer including an electrode active material can be separated from a current collector. Next, the separated electrode layer is dried under reduced pressure. The obtained electrode layer is ground in a mortar or the like to provide a powder containing the target active material for a battery, conductive auxiliary agent, and binder or the like. By dissolving the powder in an acid, a liquid sample containing the active material for a battery can be prepared. At this time, hydrochloric acid, nitric acid, sulfuric acid, and hydrogen fluoride or the like can be used as the acid. The composition of the active material for a battery can be found by subjecting the liquid sample to ICP emission spectroscopic analysis.

According to the first embodiment, the active material for a battery including the composite oxide having the monoclinic crystal structure is provided. This composite oxide is represented by the general formula of $Li_wNa_{2-x}M1_yTi_{6-z}M2_zO_{13+\delta}$. The composite oxide can contain a comparatively large Li-inserting site per unit lattice volume. In addition, in the composite oxide, the potential can be continuously and gently changed in a potential range of 1.0 V to 1.45 V (vs. Li/Li$^+$) accompanying the change of the state-of-charge. Further, the composite oxide has a crystal structure from which lithium ions can be easily extracted, and can increase the charge-and-discharge capacity. As a result, the active material for a battery according to the first embodiment can realize a nonaqueous electrolyte battery capable of exhibiting high energy density and excellent rapid charge-and-discharge characteristics, and capable of easily controlling the charge-and-discharge state.

Second Embodiment

According to a second embodiment, a nonaqueous electrolyte battery is provided. The nonaqueous electrolyte battery includes a negative electrode including the active material for a battery according to the first embodiment, a positive electrode, and a nonaqueous electrolyte.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode can include a current collector, and a negative electrode layer (a negative electrode active material-containing layer). The negative electrode layer can be formed on one or both surfaces of the current collector. The negative electrode layer can include a negative electrode active material, and optionally a conductive agent and a binder.

The active material for a battery according to the first embodiment can be included in the negative electrode layer as the negative electrode active material. In the negative electrode using the active material for a battery according to the first embodiment, the potential can be continuously and gently changed in a potential range of 1.0 V to 1.45 V (vs. Li/Li$^+$) accompanying the change of the state-of-charge. Further, the monoclinic composite oxide included in the active material for a battery according to the first embodiment can have a crystal structure from which lithium ions can be easily extracted, and thus an excellent charge-and-discharge capacity can be realized. For such reason, a nonaqueous electrolyte battery according to the second embodiment including such a negative electrode can show high energy density and excellent rapid charge-and-discharge characteristics, and can easily control the charge-and-discharge state.

The negative electrode using the active material for a battery according to the first embodiment can exhibit a comparatively low average operating potential of 1.2 V (vs. Li/Li$^+$) to 1.4 V (vs. Li/Li$^+$), and this average operating potential can be controlled by adjusting the amount of Na in the monoclinic composite oxide of $Li_xNa_{2-x}M1_yTi_{6-z}M2_zO_{13+\delta}$.

In the negative electrode, the active material for a battery according to the first embodiment may be used alone as the negative electrode active material, but a mixture of the active material for a battery according to the first embodiment and another active material may also be used. Examples of other active materials may include a lithium titanate having a ramsdellite structure (for example, $Li_2Ti_3O_7$), a lithium titanate having a spinel structure (for example, $Li_4Ti_5O_{12}$), monoclinic titanium dioxide (TiO$_2$ (B)), an anatase type titanium dioxide, a rutile type titanium dioxide, a hollandite type titanium composite oxide, a monoclinic niobium titanium composite oxide (for example, $Nb_2TiO_7$), a lithium sodium titanate ($Na_2Li_2Ti_6O_{14}$), a lithium strontium titanate ($Li_2SrTi_6O_{14}$), and the like.

The conductive agent is added to improve a current collection performance and to suppress the contact resistance between the negative electrode active material and the current collector. Examples of the conductive agent include carbonaceous substances such as vapor grown carbon fiber (VGCF), acetylene black, carbon black, and graphite.

The binder is added to fill gaps in the dispersed negative electrode active material and also to bind the negative electrode active material with the current collector. Examples of the binder include polytetrafluoroethylene (PTFE), polyvinylidene fluoride (PVdF), fluorine rubber, styrene-butadiene rubber, a polyacrylic acid compound, and an imide compound.

The blending ratios of the active material, conductive agent and binder in the negative electrode layer are preferably 68% by mass to 96% by mass, 2% by mass to 30% by mass, and 2% by mass to 30% by mass, respectively. When the content of the conductive agent is 2% by mass or more, the current collection performance of the negative electrode layer can be improved. When the content of the binder is 2% by mass or more, binding between the negative electrode layer and current collector is sufficiently achieved, and excellent cycling characteristics can be expected. On the other hand, each of the contents of the conductive agent and binder is preferably 28% by mass or less, thereby increasing the capacity.

As the current collector, a material which is electrochemically stable at the lithium insertion and extraction potential of the negative electrode active material is used. The current collector is preferably made of copper, nickel, stainless steel or aluminum, or an aluminum alloy containing one or more elements selected from Mg, Ti, Zn, Mn, Fe, Cu, and Si. The thickness of the current collector is preferably 5 to 20 µm. The current collector having such a thickness can keep a balance between the strength and weight reduction of the negative electrode.

By using the active material for a battery according to the first embodiment, the density of the negative electrode layer (excluding the current collector) can be set to the range of 1.8 g/cm$^3$ to 2.8 g/cm$^3$. The negative electrode in which the density of the negative electrode layer is within the range can exhibit an excellent energy density and excellent electrolytic solution holdablility. More preferably, the density of the negative electrode layer is 2.1 g/cm$^3$ to 2.6 g/cm$^3$.

The negative electrode is produced by, for example, suspending a negative electrode active material, a binder, and a conductive agent in an ordinary solvent to prepare a slurry, applying the slurry to a current collector, drying the coating to form a negative electrode layer, and then pressing the layer. Alternatively, the negative electrode may be also produced by forming a negative electrode active material, a binder, and a conductive agent into pellets to produce a negative electrode layer, and placing it on a current collector.

2) Positive Electrode

The positive electrode can include a current collector and a positive electrode layer (positive electrode active material-containing layer). The positive electrode layer may be formed on one or both surfaces of the current collector. The positive electrode layer can include a positive electrode active material, and optionally a conductive agent and a binder.

The positive electrode active material may be, for example, an oxide or a sulfide. Examples of the oxide and sulfide include a compound into which lithium can be inserted and from which lithium can be extracted. Specific examples thereof include a manganese dioxide ($MnO_2$), an iron oxide, a copper oxide, a nickel oxide, a lithium manganese composite oxide (e.g., $Li_xMn_2O_4$ or $Li_xMnO_2$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium manganese nickel composite oxide having a spinel structure (e.g., $Li_xMn_{2-y}Ni_yO_4$), a lithium phosphorus oxide having an olivine structure (e.g., $Li_xFePO_4$, $Li_xFe_{1-y}Mn_yPO_4$, and $Li_xCoPO_4$), an iron sulfate [$Fe_2(SO_4)_3$], a vanadium oxide (e.g., $V_2O_5$), and a lithium nickel cobalt manganese composite oxide. In the above-described formula, $0<x\le1$, and $0<y\le1$. As the active material, one of these compounds may be used singly, or combination of two or more of the compounds can be used.

More preferred examples of the positive electrode active material is one having a high positive electrode voltage. Specific examples thereof include a lithium manganese composite oxide (e.g., $Li_xMn_2O_4$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese nickel composite oxide having a spinel structure (e.g., $Li_xMn_{2-y}Ni_yO_4$), a lithium manganese cobalt composite oxide (e.g., $Li_xMn_yCo_{1-y}O_2$), a lithium iron phosphate (e.g., $Li_xFePO_4$), and a lithium nickel cobalt manganese composite oxide. In the above-described formula, $0<x\le1$, and $0<y\le1$.

When an ordinary-temperature molten salt is used as the nonaqueous electrolyte of the battery, preferred examples of the positive electrode active material include lithium iron phosphate, $Li_xVPO_4F$ ($0\le x\le1$), lithium manganese composite oxide, lithium nickel composite oxide, and lithium nickel cobalt composite oxide. Since these compounds have low reactivity with ordinary-temperature molten salts, they can improve the cycle life.

The primary particle size of the positive electrode active material is preferably 100 nm to 1 µm. The positive electrode active material having a primary particle size of 100 nm or more is easy to handle during industrial production. The positive electrode active material having a primary particle size of 1 µm or less can allow lithium ions to smoothly diffuse in solids.

The specific surface area of the positive electrode active material is preferably 0.1 m$^2$/g to 10 m$^2$/g. The positive electrode active material having a specific surface area of 0.1 m$^2$/g or more can secure sufficient sites in which lithium ions can be inserted and extracted. The positive electrode active material having a specific surface area of 10 m$^2$/g or less is easy to handle during industrial production, and can secure a good charge-and-discharge cycle performance.

The binder is added to bind the positive electrode active material with the current collector. Examples of the binder include polytetrafluoroethylene (PTFE), polyvinylidene fluoride (PVdF), fluorine rubber, a polyacrylic acid compound, and an imide compound.

The conductive agent is as necessary added to improve the current collection performance, and to suppress the contact resistance between the positive electrode active material and current collector. Examples of the conductive agent include carbonaceous substances such as acetylene black, carbon black and graphite.

In the positive electrode layer, the blending ratios of the positive electrode active material and binder are preferably 80% by mass to 98% by mass, and 2% by mass to 20% by mass, respectively.

When the binder content is 2% by mass or more, sufficient electrode strength can be achieved. When the binder content is 20% by mass or less, the loading of the insulator in the electrode can be reduced, and thereby the internal resistance can be decreased.

When a conductive agent is added, the blending ratios of the positive electrode active material, binder, and conductive agent are preferably 77% by mass to 95% by mass, 2% by mass to 20% by mass, and 3% by mass to 15% by mass, respectively. When the content of the conductive agent is 3% by mass or more, the above-described effects can be achieved. By setting the amount of the positive electrode conductive agent to 15% by mass or less, the decomposition of a nonaqueous electrolyte on the surface of the positive electrode conductive agent in high-temperature storage can be reduced.

The current collector is preferably an aluminum foil, or an aluminum alloy foil containing one or more elements selected from Mg, Ti, Zn, Ni, Cr, Mn, Fe, Cu, and Si.

The thickness of the aluminum foil or aluminum alloy foil is preferably 5 μm to 20 μm, and more preferably 15 μm or less. The purity of the aluminum foil is preferably 99% by mass or more. The content of the transition metal such as iron, copper, nickel, or chromium contained in the aluminum foil or aluminum alloy foil is preferably 1% by mass or less.

The positive electrode is produced by, for example, suspending a positive electrode active material, a binder, and as necessary a conductive agent in an appropriate solvent to prepare a slurry, applying the slurry to a positive electrode current collector, drying the coating to form a positive electrode layer, and then pressing the layer. Alternatively, the positive electrode may be also produced by forming an active material, a binder, and as necessary a conductive agent into pellets to produce a positive electrode layer, and placing it on a current collector.

3) Nonaqueous Electrolyte

The nonaqueous electrolyte may be, for example, a liquid nonaqueous electrolyte which is prepared by dissolving an electrolyte in an organic solvent, or gel-like nonaqueous electrolyte which is a composite of a liquid electrolyte and a polymer material.

The liquid nonaqueous electrolyte is preferably prepared by dissolving an electrolyte in an organic solvent in the concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); γ-butyrolactone (GBL), acetonitrile (AN), and sulfolane (SL). One of these organic solvents can be used alone or a mixed solvent can be used.

Examples of the polymeric material include polyvinylidene fluoride (PVdF), polyacrylonitrile (PAN), and polyethylene oxide (PEO).

Alternatively, the nonaqueous electrolyte may be, for example, an ordinary-temperature molten salt (ionic melt) containing lithium ions, a polymer solid electrolyte, or an inorganic solid electrolyte.

The ordinary-temperature molten salt (ionic melt) means compounds which can exist in a liquid state at ordinary temperature (15 to 25° C.) among organic salts constituted of combinations of organic cations and anions. The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium skeleton.

The polymer solid electrolyte is prepared by dissolving the electrolyte in a polymeric material, and solidifying it.

The inorganic solid electrolyte is a solid substance having lithium ion conductivity.

4) Separator

The separator may be made of, for example, a porous film or synthetic resin nonwoven fabric containing polyethylene, polypropylene, cellulose, or polyvinylidene fluoride (PVdF). Among these, a porous film containing polyethylene or polypropylene can improve safety because the porous film melts at a fixed temperature to be able to shut off a current.

5) Container Member

The container member may be, for example, a laminate film having a thickness of 0.5 mm or less, or a metal case having a wall thickness of 1 mm or less. The thickness of the laminate film is more preferably 0.2 mm or less. The wall thickness of the metal case is more preferably 0.5 mm or less, and still more preferably 0.2 mm or less.

The shape of the container member is not particularly limited, and may be, for example, flat (thin), square, cylinder, coin, or button-shaped. The container member depends on the size of the battery, and may be that for a compact battery mounted on mobile electronic devices, and a large battery mounted on two- to four-wheel automobiles.

The laminate film used herein is a multilayer film including resin layers and a metal layer sandwiched between the resin layers. The metal layer is preferably an aluminum foil or an aluminum alloy foil for reducing weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

6) Positive Electrode Terminal and Negative Electrode Terminal

The positive electrode terminal may be made of, for example, a material which is electrically stable in the potential range of 3 V to 5 V based on the oxidation-reduction potential of lithium, and has electrical conductivity. Specifically, the positive electrode terminal is made of aluminum or an aluminum alloy containing Mg, Ti, Zn, Mn, Fe, Cu, and Si or the like. The positive electrode terminal is preferably made of the same material as the positive electrode current collector in order to reduce contact resistance with the positive electrode current collector.

The negative electrode terminal may be made of a material which is electrochemically stable at the potential at which the negative electrode active material described above inserts and extracts Li, and has electrical conductivity. Specific examples of the material for the negative electrode terminal include copper, nickel, stainless steel, or aluminum. The negative electrode terminal is preferably made of the same material as the negative electrode current collector in order to reduce the contact resistance with the negative electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 3 and 4.

Figure 3:
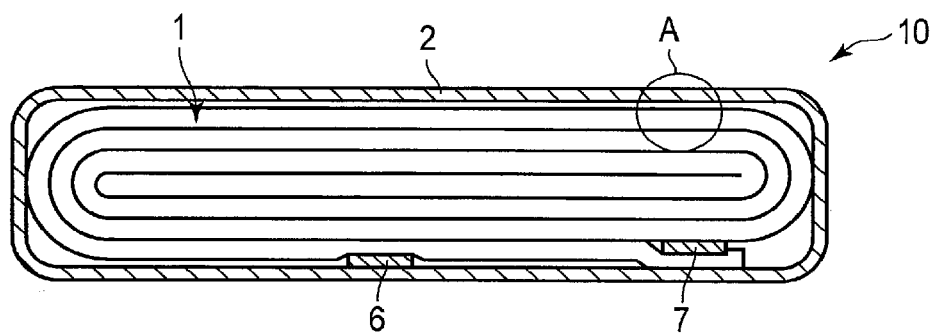
FIG. 3 is a cross-sectional view showing a nonaqueous electrolyte battery, which is one example according to a second embodiment.

FIG. 3 is a cross sectional view of a nonaqueous electrolyte battery as an example according to the second embodiment. FIG. 4 is an enlarged cross sectional view showing a portion A in FIG. 3.

Figure 4:
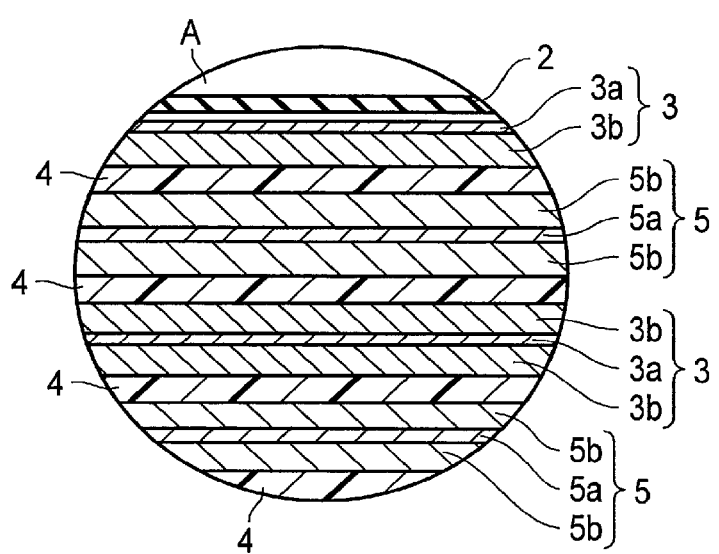
FIG. 4 is an enlarged cross-sectional view showing a portion A in FIG. 3.

A nonaqueous electrolyte battery 10 shown in FIGS. 3 and 4 includes a bag-shaped container member 2 shown in FIG. 3, an electrode group 1 shown in FIGS. 3 and 4, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 3, the electrode group 1 is a coiled electrode group in a flat form. The coiled electrode group 1 in a flat form is formed by, as shown in FIG. 4, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. The negative electrode layer 3b contains the active material for a battery according to the first embodiment. A part of the negative electrode 3 located in the outermost layer has a configuration in which a negative electrode layer 3b is formed on one surface which is the internal surface of a negative electrode current collector 3a as shown in FIG. 4. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 3, in the vicinity of the outer peripheral edge of the coiled electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 3 and 4 can be produced according to the following procedure, for example. First, an electrode group 1 is produced. The electrode group 1 is then enclosed in a bag-shaped container member 2. At that time, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the coiled electrode group 1 and the liquid state nonaqueous electrolyte are completely sealed.

Figure 5:
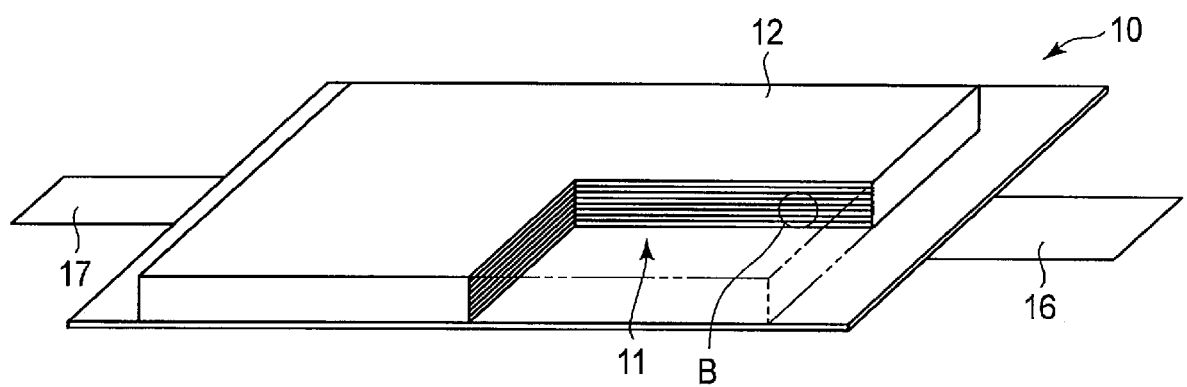
FIG. 5 is a partially cutaway perspective view schematically showing another nonaqueous electrolyte battery according to the second embodiment.
Figure 6:
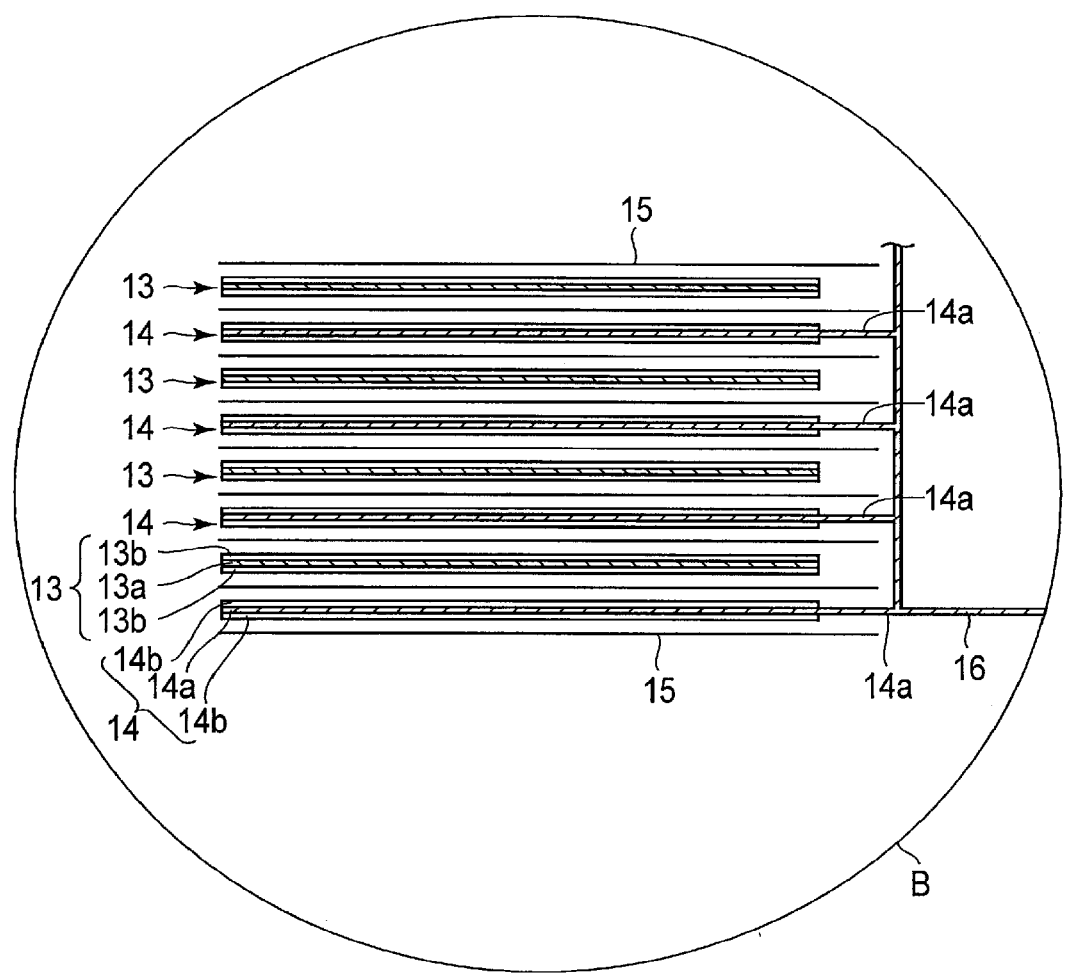
FIG. 6 is an enlarged cross-sectional view showing a portion B in FIG. 5.

The nonaqueous electrolyte battery according to the second embodiment is not limited to the nonaqueous electrolyte battery as an example shown in FIGS. 3 and 4, and may be, for example, a battery having a structure shown in FIGS. 5 and 6.

FIG. 5 is a partially cutaway perspective view schematically showing a nonaqueous electrolyte battery as another example according to the second embodiment. FIG. 6 is an enlarged cross sectional view showing a portion B in FIG. 5.

A nonaqueous electrolyte battery 10 shown in FIGS. 5 and 6 includes an electrode group 11 shown in FIGS. 5 and 6, a container member 12 shown in FIG. 5, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 6, the electrode group 11 is a stacked electrode group. As shown in FIG. 6, the stacked electrode group 11 has a structure in which positive electrodes 13 and negative electrodes 14 are alternately laminated with a separator 15 sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the positive electrode current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment includes the active material for a battery according to the first embodiment. The nonaqueous electrolyte battery according to the second embodiment, accordingly, can exhibit a high energy density and excellent rapid charge-and-discharge characteristics, and can easily perform the management of the charge-and-discharge state.

Third Embodiment

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The plurality of nonaqueous electrolyte batteries can be electrically connected in series, in parallel, or with a combination of series connection and parallel connection to constitute a battery module. The battery pack according to the third embodiment may include a plurality of battery modules.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise a power distribution external terminal (an external power distribution terminal). The power distribution external terminal is configured to externally output the current from the nonaqueous electrolyte battery, and to input the current to the nonaqueous electrolyte battery. In other words, when the battery pack is used as a power source, the current is externally provided via the power distribution external terminal. Also, when the battery pack is charged, the charging current (including regenerative energy caused by power of vehicles such as automobiles) is provided to the battery pack via the power distribution external terminal.

Next, a battery pack as an example according to the third embodiment will be described with reference to the drawings.

Figure 7:
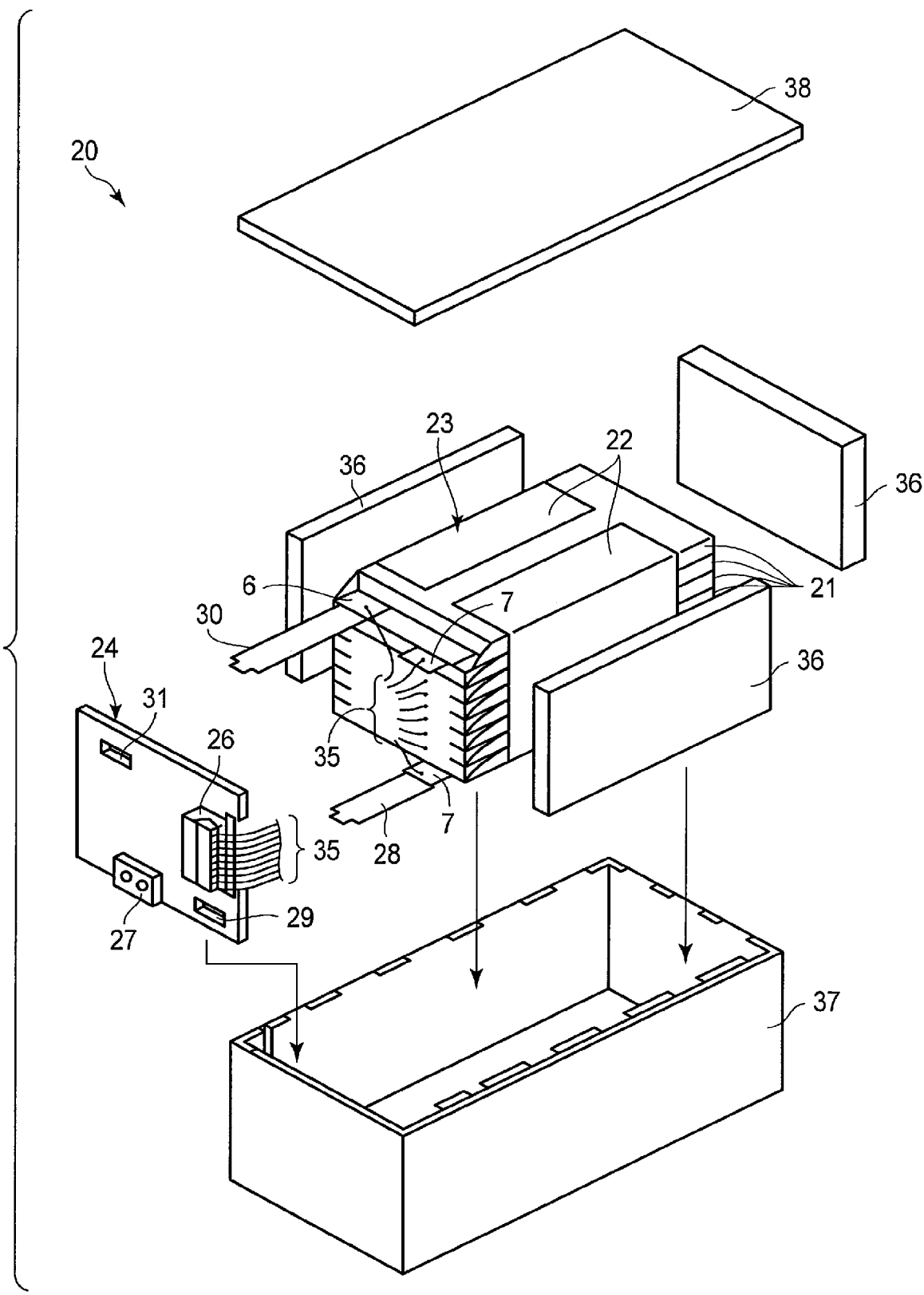
FIG. 7 is an exploded perspective view showing one example of a battery pack according to a third embodiment.
Figure 8:
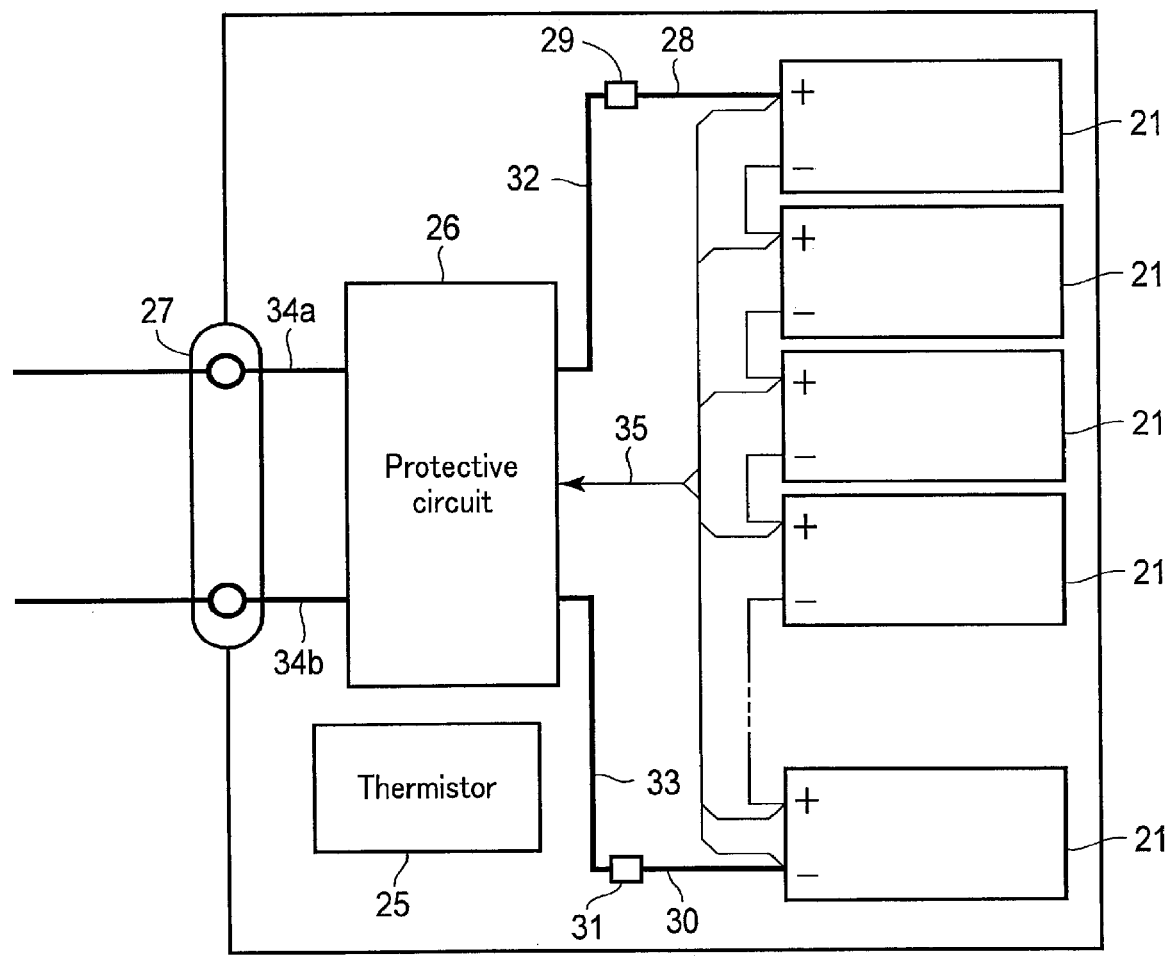
FIG. 8 is a block diagram showing an electric circuit of the battery pack in FIG. 7.

FIG. 7 is an exploded perspective view of a battery pack as an example according to the third embodiment. FIG. 8 is a block diagram showing an electric circuit of the battery pack of FIG. 7.

A battery pack 20 shown in FIGS. 7 and 8 includes a plurality of unit cells 21. Each of the plurality of unit cells 21 is flat nonaqueous electrolyte battery 10 described with reference to FIGS. 3 and 4.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 8.

A printed wiring board 24 is arranged opposed to the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 8. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the overcharge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 7 and 8, wirers 35 for voltage detection are connected to each of the unit cells 21. Detection signals are sent to the protective circuit 26 through the wirers 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 7 and 8, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and trains (electric trains).

Figure 9:
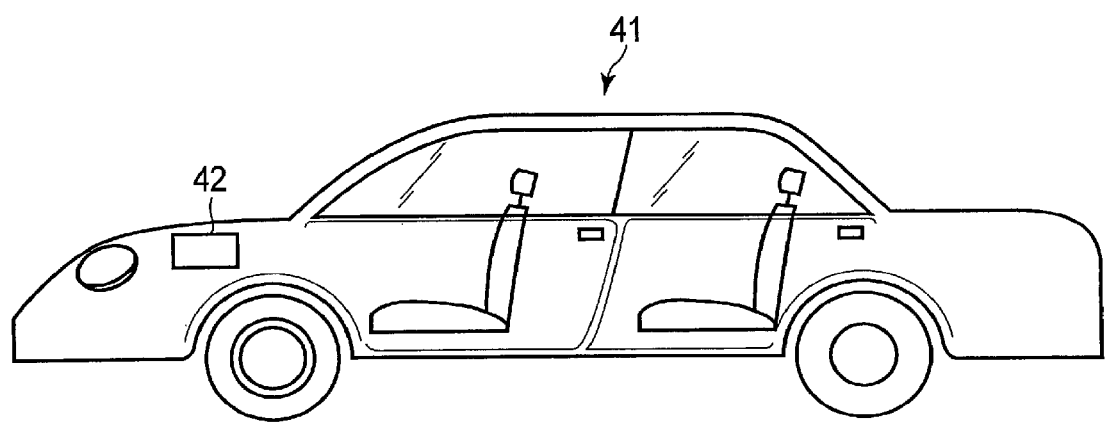
FIG. 9 is a schematic sectional view showing an example of an automobile which includes a battery pack according to a third embodiment.

FIG. 9 shows an example of an automobile which includes a battery pack according to the third embodiment.

The automobile 41 shown in FIG. 9 includes a battery pack 42 which is an example of the battery pack according to the third embodiment mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Therefore, the battery pack according to the third embodiment can exhibit a high energy density and excellent rapid charge-and-discharge characteristics, and can easily perform the management of the charge-and-discharge state.

EXAMPLE

Hereinafter, the above embodiments are explained in more detail by means of Examples. Should be noted that the identification of a crystal phase and the estimation of a crystal structure of each of synthesized monoclinic composite oxides were performed according to the powder X-ray diffraction method using Cu-Kα rays. In addition, the composition of a product was analyzed by the ICP method, and to confirm a target product was obtained.

Synthesis

Examples 1 to 23

In Examples 1 to 23, products of Examples 1 to 23 were synthesized according to the following procedures. The target compositions in Examples 1 to 23 are shown in Table 1 below.

First, as starting materials, commercially available oxide and carbonate regents shown in Table 1 below were provided so that they satisfied a molar ratio shown in Table 1 and the total amount thereof was 50 g. Next, the starting materials thus provided were mixed, and the mixture was put into an agate pod (having a volume of 300 ml) for a ball mill. To the pod were added agate balls having a diameter of 10 mm or 5 mm in a ratio of 1:1 so that the balls amounted to ⅓ of the volume of the pod. After that, 50 ml of ethanol was added to the pod, and wet-mixing was performed at 120 rpm for 60 minutes to obtain a mixture. The starting materials are uniformly mixed by such wet-mixing, and thus a target single crystal phase can be obtained.

Next, the thus obtained mixture was put into an electric furnace, and was subjected to a heating treatment according to the following procedures.

First, calcination was performed at a temperature of 650° C. for 6 hours in an air atmosphere. Next, the powder obtained by the calcination was taken out from the furnace, and was pulverized again and further mixed. As described above, when the calcination was previously performed to decompose the carbonates in the staring materials, and the resulting powder was re-mixed, the starting material particles can adhere to each other during main-sintering, and consequently uniform particles having high crystallinity can be obtained.

The thus obtained mixture was subsequently subjected to a first sintering at a temperature of 950° C. for 6 hours. After the sintering, the sintered powder was taken out from the furnace, and was re-mixed.

Subsequently, the re-mixed sintered powder was put into the furnace and was subjected to a second sintering at a temperature of 950° C. for 6 hours in an air atmosphere.

In Examples 1 to 16 and 23, the powder obtained after the second sintering, i.e., the powder obtained by sintering at a temperature of 950° C. for 12 hours in total was used as a product of each of Examples 1 to 16 and 23. On the other hand, in Examples 17 to 22, because peaks of impurities were observed from the results of the powder X-ray diffraction measurement, after the second sintering, the sintered powder was taken out from the furnace and was re-mixed, and then the sintered powder was put into the furnace and was subjected to a third sintering at a temperature of 950° C. for 6 hours in an air atmosphere. The powder after the third sintering, i.e., the powder obtained by sintering at a temperature of 950° C. for 18 hours in total was used as a product of each of Examples 17 to 22.

TABLE 1

| | Target Composition | Li Source/ Amount | Na Source/ Amount | M1 Source/ Amount | Ti Source/ Amount | M2 Source/ Amount |
|---|---|---|---|---|---|---|
| Comparative Example 1 | $Na_2Ti_6O_{13}$ | — | $Na_2CO_3$/1.0 | — | $TiO_2$/6.0 | — |
| Comparative Example 2 | $Li_2Na_{1.75}Ti_{5.75}Nb_{0.25}O_{14}$ | $Li_2CO_3$/1.0 | $Na_2CO_3$/0.875 | — | $TiO_2$/5.75 | $Nb_2O_5$/0.125 |
| Example 1 | $Na_{1.9}Ti_{5.9}Nb_{0.1}O_{13}$ | — | $Na_2CO_3$/0.95 | — | $TiO_2$/5.9 | $Nb_2O_5$/0.05 |
| Example 2 | $Na_{1.75}Ti_{5.75}Nb_{0.25}O_{13}$ | — | $Na_2CO_3$/0.875 | — | $TiO_2$/5.75 | $Nb_2O_5$/0.125 |
| Example 3 | $Na_{1.5}Ti_{5.5}Nb_{0.5}O_{13}$ | — | $Na_2CO_3$/0.75 | — | $TiO_2$/5.5 | $Nb_2O_5$/0.25 |
| Example 4 | $Na_{1.25}Ti_{5.25}Nb_{0.75}O_{13}$ | — | $Na_2CO_3$/0.625 | — | $TiO_2$/5.25 | $Nb_2O_5$/0.375 |
| Example 5 | $NaTi_5NbO_{13}$ | — | $Na_2CO_3$/0.5 | — | $TiO_2$/5.0 | $Nb_2O_5$/0.5 |
| Example 6 | $Na_{0.75}Ti_{4.75}Nb_{1.25}O_{13}$ | — | $Na_2CO_3$/0.375 | — | $TiO_2$/4.75 | $Nb_2O_5$/0.625 |
| Example 7 | $Na_{0.5}Ti_{4.5}Nb_{1.5}O_{13}$ | — | $Na_2CO_3$/0.25 | — | $TiO_2$/4.5 | $Nb_2O_5$/0.75 |
| Example 8 | $Na_{0.25}Ti_{4.25}Nb_{1.75}O_{13}$ | — | $Na_2CO_3$/0.125 | — | $TiO_2$/4.25 | $Nb_2O_5$/0.875 |
| Example 9 | $Na_{0.1}Ti_{4.1}Nb_{1.9}O_{13}$ | — | $Na_2CO_3$/0.1 | — | $TiO_2$/4.1 | $Nb_2O_5$/0.9 |
| Example 10 | $Na_{1.9}Ti_{5.9}Ta_{0.1}O_{13}$ | — | $Na_2CO_3$/0.95 | — | $TiO_2$/5.9 | $Ta_2O_5$/0.05 |
| Example 11 | $Na_{1.75}Ti_{5.75}Nb_{0.15}Ta_{0.1}O_{13}$ | — | $Na_2CO_3$/0.875 | — | $TiO_2$/5.75 | $Nb_2O_5$/0.075 $Ta_2O_5$/0.05 |
| Example 12 | $Na_{1.9}Ti_{5.8}Zr_{0.1}Ta_{0.1}O_{13}$ | — | $Na_2CO_3$/0.95 | — | $TiO_2$/5.8 | $Ta_2O_5$/0.05 $ZrO_2$/0.1 |
| Example 13 | $Na_{1.9}Ti_{5.8}Sn_{0.1}Ta_{0.1}O_{13}$ | — | $Na_2CO_3$/0.95 | — | $TiO_2$/5.8 | $Ta_2O_5$/0.05 $SnO_2$/0.1 |

TABLE 1-continued

| | Target Composition | Li Source/ Amount | Na Source/ Amount | M1 Source/ Amount | Ti Source/ Amount | M2 Source/ Amount |
|---|---|---|---|---|---|---|
| Example 14 | $Na_{1.9}Ti_{5.9}V_{0.1}O_{13}$ | — | $Na_2CO_3/0.95$ | — | $TiO_2/5.9$ | $V_2O_5/0.05$ |
| Example 15 | $Na_{1.8}Ti_{5.9}Mo_{0.1}O_{13}$ | — | $Na_2CO_3/0.9$ | — | $TiO_2/5.9$ | $MoO_3/0.1$ |
| Example 16 | $Na_{1.8}Ti_{5.9}W_{0.1}O_{13}$ | — | $Na_2CO_3/0.9$ | — | $TiO_2/5.9$ | $WO_3/0.1$ |
| Example 17 | $Na_{1.7}Mg_{0.1}Ti_{5.9}Nb_{0.1}O_{13}$ | — | $Na_2CO_3/0.85$ | $MgO/0.1$ | $TiO_2/5.9$ | $Nb_2O_5/0.05$ |
| Example 18 | $Na_{1.7}Sr_{0.1}Ti_{5.9}Nb_{0.1}O_{13}$ | — | $Na_2CO_3/0.85$ | $SrCO_3/0.1$ | $TiO_2/5.9$ | $Nb_2O_5/0.05$ |
| Example 19 | $Na_{1.7}Ca_{0.1}Ti_{5.9}Nb_{0.1}O_{13}$ | — | $Na_2CO_3/0.85$ | $CaCO_3/0.1$ | $TiO_2/5.9$ | $Nb_2O_5/0.05$ |
| Example 20 | $Na_{1.7}Ba_{0.1}Ti_{5.9}Nb_{0.1}O_{13}$ | — | $Na_2CO_3/0.85$ | $BaCO_3/0.1$ | $TiO_2/5.9$ | $Nb_2O_5/0.05$ |
| Example 21 | $Na_{1.8}Cs_{0.1}Ti_{5.9}Nb_{0.1}O_{13}$ | — | $Na_2CO_3/0.9$ | $Cs_2CO_3/0.05$ | $TiO_2/5.9$ | $Nb_2O_5/0.05$ |
| Example 22 | $Na_{1.8}K_{0.1}Ti_{5.9}Nb_{0.1}O_{13}$ | — | $Na_2CO_3/0.9$ | $K_2CO_3/0.05$ | $TiO_2/5.9$ | $Nb_2O_5/0.05$ |
| Example 23 | $Li_{0.1}Na_{1.4}Ti_{5.5}Nb_{0.5}O_{13}$ | $Li_2CO_3/0.05$ | $Na_2CO_3/0.7$ | — | $TiO_2/5.5$ | $Nb_2O_5/0.25$ |

Comparative Examples 1 and 2

In each of Comparative Examples 1 and 2, in order to obtain a target compound shown in Table 1 above, as starting materials, commercially available oxide and carbonate regents shown in Table 1 below were provided so that they satisfied a molar ratio shown in Table 1 and the total amount thereof was 50 g. Next, the starting materials thus provided were mixed, and the mixture was put into an agate pod (having a volume of 300 ml) for a ball mill. To the pod were added agate balls having a diameter of 10 mm or 5 mm in a number ratio of 1:1 so that the balls amounted to ⅓ of the volume of the pod. After that, 50 ml of ethanol was added to the pod, and wet-mixing was performed at 120 rpm for 60 minutes to obtain a mixture. The starting materials are uniformly mixed by such wet-mixing, and thus a target single crystal phase can be obtained.

Next, the thus obtained mixture was put into an electric furnace, and was subjected to a heating treatment according to the following procedures.

First, in Comparative Example 1, the synthesis was performed by a general solid phase reaction method (sintering was performed one time). Specifically, the mixture obtained as above was sintered at a temperature of 900° C. for 12 hours in an air atmosphere, and then the temperature thereof was decreased to room temperature by leaving it in the electric furnace over time. The thus obtained mixture was taken out and pulverized to obtain a product of Comparative Example 1.

In Comparative Example 2, the synthesis was performed according to the following procedures.

First, the starting material mixture obtained as above was calcined at a temperature of 650° C. for 6 hours in an air atmosphere. Next, the powder obtained by the calcination was taken out from the furnace, and was pulverized again and further mixed. As described above, when the calcination was previously performed to decompose the carbonates in the staring materials, and the resulting powder was re-mixed, the starting material particles can adhere to each other in the sintering, and consequently uniform particles having high crystallinity can be obtained.

The thus obtained mixture was subsequently subjected to a first sintering at a temperature of 950° C. for 6 hours. After the sintering, the sintered powder was taken out from the furnace, and it was re-mixed.

Subsequently, the re-mixed sintered powder was put into the furnace and was subjected to a second sintering at a temperature of 950° C. for 6 hours in an air atmosphere. The powder obtained after the second sintering, i.e., by sintering at a temperature of 950° C. for 12 hours in total was pulverized to obtain a product of Comparative Example 2.

(Confirmation of Composition of Product)

The composition of each of the products of Examples 1 to 23 and Comparative Examples 1 and 2 was analyzed by the ICP method described above. The analysis results are shown in Table 2.

TABLE 2

| | | $Li_wNa_{2-x}M1_yTi_{6-z}M2_zO_{13+\delta}$ | | | |
|---|---|---|---|---|---|
| | Composition | w | x | y | z |
| Comparative Example 1 | $Na_2Ti_6O_{13}$ | 0 | 0 | 0 | 0 |
| Comparative Example 2 | $Li_2Na_{1.75}Ti_{5.75}Nb_{0.25}O_{14}$ | (not corresponding to the above general formula) | | | |
| Example 1 | $Na_{1.9}Ti_{5.9}Nb_{0.1}O_{13}$ | 0 | 0.1 | 0 | 0.1 |
| Example 2 | $Na_{1.75}Ti_{5.75}Nb_{0.25}O_{13}$ | 0 | 0.25 | 0 | 0.25 |
| Example 3 | $Na_{1.5}Ti_{5.5}Nb_{0.5}O_{13}$ | 0 | 0.5 | 0 | 0.5 |
| Example 4 | $Na_{1.25}Ti_{5.25}Nb_{0.75}O_{13}$ | 0 | 0.75 | 0 | 0.75 |
| Example 5 | $NaTi_5NbO_{13}$ | 0 | 1.0 | 0 | 1.0 |
| Example 6 | $Na_{0.75}Ti_{4.75}Nb_{1.25}O_{13}$ | 0 | 1.25 | 0 | 1.25 |
| Example 7 | $Na_{0.5}Ti_{4.5}Nb_{1.5}O_{13}$ | 0 | 1.5 | 0 | 1.5 |
| Example 8 | $Na_{0.25}Ti_{4.25}Nb_{1.75}O_{13}$ | 0 | 1.75 | 0 | 1.75 |
| Example 9 | $Na_{0.1}Ti_{4.1}Nb_{1.9}O_{13}$ | 0 | 1.9 | 0 | 1.9 |
| Example 10 | $Na_{1.9}Ti_{5.9}Ta_{0.1}O_{13}$ | 0 | 0.1 | 0 | 0.1 |
| Example 11 | $Na_{1.75}Ti_{5.75}Nb_{0.15}Ta_{0.1}O_{13}$ | 0 | 0.25 | 0 | 0.25 |
| Example 12 | $Na_{1.9}Ti_{5.8}Zr_{0.1}Ta_{0.1}O_{13}$ | 0 | 0.1 | 0 | 0.2 |
| Example 13 | $Na_{1.9}Ti_{5.8}Sn_{0.1}Ta_{0.1}O_{13}$ | 0 | 0.1 | 0 | 0.2 |
| Example 14 | $Na_{1.9}Ti_{5.9}V_{0.1}O_{13}$ | 0 | 0.1 | 0 | 0.1 |
| Example 15 | $Na_{1.8}Ti_{5.9}Mo_{0.1}O_{13}$ | 0 | 0.2 | 0 | 0.1 |
| Example 16 | $Na_{1.8}Ti_{5.9}W_{0.1}O_{13}$ | 0 | 0.2 | 0 | 0.1 |
| Example 17 | $Na_{1.7}Mg_{0.1}Ti_{5.3}Nb_{0.1}O_{13}$ | 0 | 0.3 | 0.1 | 0.1 |
| Example 18 | $Na_{1.7}Sr_{0.1}Ti_{5.9}Nb_{0.1}O_{13}$ | 0 | 0.3 | 0.1 | 0.1 |
| Example 19 | $Na_{1.7}Ca_{0.1}Ti_{5.9}Nb_{0.1}O_{13}$ | 0 | 0.3 | 0.1 | 0.1 |
| Example 20 | $Na_{1.7}Ba_{0.1}Ti_{5.9}Nb_{0.1}O_{13}$ | 0 | 0.3 | 0.1 | 0.1 |
| Example 21 | $Na_{1.8}Cs_{0.1}Ti_{5.9}Nb_{0.1}O_{13}$ | 0 | 0.2 | 0.1 | 0.1 |
| Example 22 | $Na_{1.8}K_{0.1}Ti_{5.9}Nb_{0.1}O_{13}$ | 0 | 0.2 | 0.1 | 0.1 |
| Example 23 | $Li_{0.1}Na_{1.4}Ti_{5.5}Nb_{0.5}O_{13}$ | 0.1 | 0.6 | 0 | 0.5 |

From the results, it was found that an active material having the target composition could be obtained in each of Examples 1 to 23 and Comparative Examples 1 and 2.

(Powder X-Ray Diffraction Measurement)

Each of the active materials of Examples 1 to 23 and Comparative Examples 1 and 2 was subjected to the powder X-ray diffraction measurement according to the procedures described above. Particle size distributions of the products were arranged, and the results of the powder X-ray diffraction method were analyzed by the Rietveld method. As a result, it was found that each of the active materials of Examples 1 to 23 and Comparative Example 1 was a monoclinic compound having symmetry belonging to the space group C2/m shown in FIG. 1. On the other hand, it was found that the active material of Comparative Example 2 was an orthorhombic compound having symmetry belonging to a space group Fmmm.

Further, the crystallinity of each active material was also estimated from an XRD peak line width. The analysis results of the crystal phase, the space group, the unit lattice volume, and the crystallinity of each active material are described in Table 3 below together. The number of the sintering, and the cooling conditions after the sintering in each of Examples and Comparative Examples are also shown in Table 3.

The electrochemical measurement cell of Example 1 was subjected to a charge-and-discharge test at room temperature. The charge-and-discharge test was performed based on the metal lithium electrode standard in a potential range of 1.0 V to 3.0 V at a charge-and-discharge current of 0.2 C (a

TABLE 3

|  | Composition | Crystal Phase | Space Group | Lattice Volume V [Å$^3$] | Number of Sintering | Cooling after Sintering | Crystallinity |
|---|---|---|---|---|---|---|---|
| Comparative Example 1 | $Na_2Ti_6O_{13}$ | Monoclinic | C2/m | 518.91 | 1 | Cooling in Electric Furnace | Middle-Low |
| Comparative Example 2 | $Li_2Na_{1.75}Ti_{5.75}Nb_{0.25}O_{14}$ | Orthorhombic | Fmmm | 1059.45 | 2 | Rapid Cooling | Middle |
| Example 1 | $Na_{1.9}Ti_{5.9}Nb_{0.1}O_{13}$ | Monoclinic | C2/m | 520.64 | 2 | Rapid Cooling | Middle |
| Example 2 | $Na_{1.75}Ti_{5.75}Nb_{0.25}O_{13}$ | Monoclinic | C2/m | 523.70 | 2 | Rapid Cooling | Middle |
| Example 3 | $Na_{1.5}Ti_{5.5}Nb_{0.5}O_{13}$ | Monoclinic | C2/m | 526.12 | 2 | Rapid Cooling | Middle |
| Example 4 | $Na_{1.25}Ti_{5.25}Nb_{0.75}O_{13}$ | Monoclinic | C2/m | 527.55 | 2 | Rapid Cooling | Middle |
| Example 5 | $NaTi_5NbO_{13}$ | Monoclinic | C2/m | 526.99 | 2 | Rapid Cooling | Middle |
| Example 6 | $Na_{0.75}Ti_{4.75}Nb_{1.25}O_{13}$ | Monoclinic | C2/m | 527.15 | 2 | Rapid Cooling | Middle |
| Example 7 | $Na_{0.5}Ti_{4.5}Nb_{1.5}O_{13}$ | Monoclinic | C2/m | 527.60 | 2 | Rapid Cooling | Middle |
| Example 8 | $Na_{0.25}Ti_{4.25}Nb_{1.75}O_{13}$ | Monoclinic | C2/m | 528.56 | 2 | Rapid Cooling | Middle |
| Example 9 | $Na_{0.1}Ti_{4.1}Nb_{1.9}O_{13}$ | Monoclinic | C2/m | 528.60 | 2 | Rapid Cooling | Middle |
| Example 10 | $Na_{1.9}Ti_{5.9}Ta_{0.1}O_{13}$ | Monoclinic | C2/m | 525.41 | 2 | Rapid Cooling | Middle |
| Example 11 | $Na_{1.75}Ti_{5.75}Nb_{0.15}Ta_{0.1}O_{13}$ | Monoclinic | C2/m | 522.35 | 2 | Rapid Cooling | Middle |
| Example 12 | $Na_{1.9}Ti_{5.8}Zr_{0.1}Ta_{0.1}O_{13}$ | Monoclinic | C2/m | 524.17 | 2 | Rapid Cooling | Middle |
| Example 13 | $Na_{1.9}Ti_{5.8}Sn_{0.1}Ta_{0.1}O_{13}$ | Monoclinic | C2/m | 523.20 | 2 | Rapid Cooling | Middle |
| Example 14 | $Na_{1.9}Ti_{5.9}V_{0.1}O_{13}$ | Monoclinic | C2/m | 524.98 | 2 | Rapid Cooling | High |
| Example 15 | $Na_{1.8}Ti_{5.9}Mo_{0.1}O_{13}$ | Monoclinic | C2/m | 524.67 | 2 | Rapid Cooling | High |
| Example 16 | $Na_{1.8}Ti_{5.9}W_{0.1}O_{13}$ | Monoclinic | C2/m | 525.34 | 2 | Rapid Cooling | Middle |
| Example 17 | $Na_{1.7}Mg_{0.1}Ti_{5.9}Nb_{0.1}O_{13}$ | Monoclinic | C2/m | 526.48 | 3 | Rapid Cooling | Middle |
| Example 18 | $Na_{1.7}Sr_{0.1}Ti_{5.9}Nb_{0.1}O_{13}$ | Monoclinic | C2/m | 528.65 | 3 | Rapid Cooling | High |
| Example 19 | $Na_{1.7}Ca_{0.1}Ti_{5.9}Nb_{0.1}O_{13}$ | Monoclinic | C2/m | 527.26 | 3 | Rapid Cooling | Middle |
| Example 20 | $Na_{1.7}Ba_{0.1}Ti_{5.9}Nb_{0.1}O_{13}$ | Monoclinic | C2/m | 529.11 | 3 | Rapid Cooling | Middle |
| Example 21 | $Na_{1.8}Cs_{0.1}Ti_{5.9}Nb_{0.1}O_{13}$ | Monoclinic | C2/m | 528.65 | 3 | Rapid Cooling | Middle |
| Example 22 | $Na_{1.8}K_{0.1}Ti_{5.9}Nb_{0.1}O_{13}$ | Monoclinic | C2/m | 523.94 | 3 | Rapid Cooling | Middle |
| Example 23 | $Li_{0.1}Na_{1.4}Ti_{5.5}Nb_{0.5}O_{13}$ | Monoclinic | C2/m | 526.20 | 2 | Rapid Cooling | Middle |

(Electrochemical Measurement)

Each of the active materials of Examples and Comparative Examples was subjected to an electrochemical measurement according to the following procedure. Should be noted that although the active material of Example 1 was used as an example in the following explanation, each active material of other Examples and Comparative Examples was subjected to the electrochemical measurement in the same manner as in the active material of Example 1.

First, particles of the active material of Example 1 were pulverized into a pulverized product having an average particle sized of 5 µm or less. Next, as a conductive agent, acetylene black was mixed in an amount of 10 parts by mass based on the active material to obtain a mixture. Next, the mixture was dispersed in NMP (N-methyl-2-pyrrolidone) to obtain a dispersion. With the dispersion was mixed polyvinylidene fluoride (PVdF) as a binder in an amount of 10 parts by mass based on the active material of Example 1 to obtain a slurry for an electrode. The slurry was coated on a current collector formed of an aluminum foil using a blade. The resulting product was dried at 130° C. for 12 hours in vacuo, and then was rolled so that an electrode layer (excluding the current collector) had a density of 2.2 g/cm$^3$ to obtain an electrode.

Using the resulting electrode, a metal lithium foil as a counter electrode, and a nonaqueous electrolyte, an electrochemical measurement cell of Example 1 was produced. As the nonaqueous electrolyte, a solution in which lithium hexafluorophosphate (LiPF$_6$) was dissolved in a mixed solvent of ethylene carbonate and diethyl carbonate (a volume ratio of 1:1) in a concentration of 1 M was used.

time discharge rate). In this test, the initial insertion amount of Li was defined as an initial charge capacity [mAh/g], and the initial extraction amount of Li was defined as an initial discharge capacity [mAh/g]. The initial charge capacity and the initial discharge capacity are a capacity per weight [g] of the active material of Example 1, respectively. At this time, a value obtained by dividing the initial discharge capacity by the initial charge capacity, and multiplying the resulting value by 100 (initial discharge capacity/initial charge capacity×100) was defined as an initial charge-and-discharge efficiency [%]. In this charge-and-discharge test, a charge-and-discharge curve of the electrochemical measurement cell of Example 1 was obtained.

Next, in order to confirm that the active material of Example 1 can be stably charged and discharged, the electrochemical measurement cell of Example 1 was subjected to the charge-and-discharge repeatedly for 50 cycles. One cycle includes one charge and one discharge. The charge-and-discharge was performed based on the metal lithium electrode standard in a potential range of 1.0 V to 3.0 V at a current of 1 C (a time discharge rate) at room temperature.

In order to measure a discharge capacity retention ratio after 50 cycles, the electrochemical measurement cell of Example was subjected to charge-and-discharge again at 0.2 C (a time discharge rate), and a capacity retention ratio was calculated based on 100% of the initial discharge capacity.

In addition, a 0.2 C discharge capacity [mAh/g] and a 10.0 C discharge capacity [mAh/g] per weight [g] of the active material of the electrochemical measurement cell of Example 1 were measured. A discharge rate was calculated by dividing the discharge capacity as measured at 10.0 C by the discharge capacity as measured at 0.2 C, as an index of rate characteristics.

In addition, a potential [V vs. Li/Li⁺] of the electrochemical measurement cell of Example 1 was measured at a half state-of-charge (50% state-of-charge=SOC 50% when the full state-of-charge is defined as 100%). Here, the potential at SOC 50% refers to an electrode potential in an open circuit to the metal Li in the half state-of-charge (a potential obtained in a manner in which the charge was performed at 0.2 C from a full discharge (Li extraction) state until 50% of the capacity was charged (Li insertion), and then it was kept in an open circuit state for 1 hour.

For each of the electrochemical measurement cells for of Examples 1 to 23 and Comparative Examples 1 and 2, the initial discharge capacity [mAh/g] per weight [g] of the active material, the initial charge-and-discharge efficiency [%], the 10 C/0.2 C discharge capacity ratio [%], the capacity retention ratio [%] after 50 cycles, the potential [V vs. Li/Li⁺] at SOC 50%, and presence or absence of the potential-step on the charge-and-discharge curve are shown in Table 4 below.

easily move, because the number of oxide ions contained in the structure is 13 moles per mole of the active material in Examples 1 to 23. It is also considered that the value of the subscript x is larger than that of the subscript y in the active materials of Examples 1 to 23, and thus they contain vacancies. It is considered that in Examples 1 to 23, the presence of the vacancies also contributes to easy movement of the lithium ions because the number of the lithium host sites is increased.

Further, from the results of Examples 14 and 15, it is found that when a low melting point compound containing Mo or V enters into the crystal structure, the crystallinity is increased and the rate characteristics are also improved.

From these results, it is known that when at least one active material of Examples described above is used, the battery voltage or the electrode capacity can be arbitrarily adjusted depending on the application of the battery. For example, when the battery is used as a battery module for an automobile whose operating potential range is decided, by

TABLE 4

| | Composition | Initial Discharge Capacity (mAh/g) | Inititial Charge and Discharge Efficiency (%) | 10 C/0.2 C Discharge Capacity Ratio (%) | Capacity Retention Ratio after 50 cycles (%) | Potential in SOC 50% (V vs. Li⁺/Li) | Existence of Potential Step |
|---|---|---|---|---|---|---|---|
| Comparative Example 1 | $Na_2Ti_6O_{13}$ | 131.8 | 88.5 | 93.1 | 80.5 | 1.38 | Yes |
| Comparative Example 2 | $Li_2Na_{1.75}Ti_{5.75}Nb_{0.25}O_{14}$ | 115.9 | 92.5 | 92.7 | 93.8 | 1.30 | No |
| Example 1 | $Na_{1.9}Ti_{5.9}Nb_{0.1}O_{13}$ | 132.5 | 90.1 | 95.6 | 82.3 | 1.32 | No |
| Example 2 | $Na_{1.75}Ti_{5.75}Nb_{0.25}O_{13}$ | 138.3 | 92.5 | 96.3 | 84.5 | 1.28 | No |
| Example 3 | $Na_{1.5}Ti_{5.5}Nb_{0.5}O_{13}$ | 142.2 | 92.8 | 96.5 | 85.7 | 1.31 | No |
| Example 4 | $Na_{1.25}Ti_{5.25}Nb_{0.75}O_{13}$ | 140.4 | 92.6 | 97.2 | 86.8 | 1.33 | No |
| Example 5 | $NaTi_5NbO_{13}$ | 140.9 | 92.8 | 96.4 | 88.1 | 1.35 | No |
| Example 6 | $Na_{0.75}Ti_{4.75}Nb_{1.25}O_{13}$ | 141.3 | 92.7 | 97.1 | 87.6 | 1.36 | No |
| Example 7 | $Na_{0.5}Ti_{4.5}Nb_{1.5}O_{13}$ | 143.2 | 93.0 | 97.4 | 88.1 | 1.38 | No |
| Example 8 | $Na_{0.25}Ti_{4.25}Nb_{1.75}O_{13}$ | 144.0 | 92.9 | 97.8 | 88.0 | 1.38 | No |
| Example 9 | $Na_{0.1}Ti_{4.1}Nb_{1.9}O_{13}$ | 145.2 | 93.2 | 97.0 | 86.2 | 1.45 | No |
| Example 10 | $Na_{1.9}Ti_{5.9}Ta_{0.1}O_{13}$ | 132.0 | 91.1 | 95.3 | 83.1 | 1.32 | No |
| Example 11 | $Na_{1.75}Ti_{5.75}Nb_{0.15}Ta_{0.1}O_{13}$ | 135.1 | 92.3 | 95.9 | 84.8 | 1.28 | No |
| Example 12 | $Na_{1.9}Ti_{5.8}Zr_{0.1}Ta_{0.1}O_{13}$ | 131.9 | 90.3 | 95.5 | 84.0 | 1.30 | No |
| Example 13 | $Na_{1.9}Ti_{5.8}Sn_{0.1}Ta_{0.1}O_{13}$ | 133.3 | 91.4 | 95.8 | 83.8 | 1.30 | No |
| Example 14 | $Na_{1.9}Ti_{5.0}V_{0.1}O_{13}$ | 133.0 | 92.4 | 98.8 | 83.8 | 1.31 | No |
| Example 15 | $Na_{1.8}Ti_{5.9}Mo_{0.1}O_{13}$ | 135.6 | 92.2 | 98.4 | 86.3 | 1.31 | No |
| Example 16 | $Na_{1.8}Ti_{5.9}W_{0.1}O_{13}$ | 135.6 | 92.2 | 98.4 | 86.3 | 1.31 | No |
| Example 17 | $Na_{1.7}Mg_{0.1}Ti_{5.9}Nb_{0.1}O_{13}$ | 138.3 | 92.5 | 96.3 | 84.5 | 1.30 | No |
| Example 18 | $Na_{1.7}Sr_{0.1}Ti_{5.9}Nb_{0.1}O_{13}$ | 140.3 | 92.3 | 97.9 | 85.8 | 1.30 | No |
| Example 19 | $Na_{1.7}Ca_{0.1}Ti_{5.9}Nb_{0.1}O_{13}$ | 133.9 | 92.6 | 95.7 | 84.6 | 1.30 | No |
| Example 20 | $Na_{1.7}Ba_{0.1}Ti_{5.9}Nb_{0.1}O_{13}$ | 137.7 | 92.4 | 96.2 | 86.1 | 1.30 | No |
| Example 21 | $Na_{1.8}Cs_{0.1}Ti_{5.9}Nb_{0.1}O_{13}$ | 132.8 | 93.1 | 97.1 | 86.3 | 1.31 | No |
| Example 22 | $Na_{1.8}K_{0.1}Ti_{5.9}Nb_{0.1}O_{13}$ | 134.1 | 92.2 | 96.8 | 84,3 | 1.31 | No |
| Example 23 | $Li_{0.1}Na_{1.4}Ti_{5.5}Nb_{0.5}O_{13}$ | 143.1 | 93.8 | 96.8 | 88.7 | 1.31 | No |

As apparent from the results shown in Table 4, the electrode capacity in Examples 1 to 23 was higher than that in Comparative Examples 1 and 2. It can be found, accordingly, that each of the active materials of Examples 1 to 23 can provide a battery having a high electrode capacity.

The initial charge-and-discharge efficiency in Examples 1 to 23 was higher than that in Comparative Example 1. It is found, accordingly, that when each of the active materials of Examples 1 to 23 is used, the application amount of the positive electrode, which has a higher charge-and-discharge efficiency than that of the negative electrode, can be decreased in the design of a battery, whereby the energy density of the battery can be increased.

The rate characteristics in Example 1 to 23 was higher than that in Comparative Examples 1 and 2. This is considered to be caused by an effect in which lithium ions can change the negative electrode potential depending on the selection of the positive electrode to be combined, as shown in Examples, a target battery voltage can be obtained. Thus, a battery and a battery pack can be provided each of which has both of the high charge-and-discharge capacity and the high battery voltage, and is excellent in the rate characteristics and the life-time property.

According to at least one of the embodiments and Examples described above, the active material for a battery including the composite oxide having the monoclinic crystal structure is provided. The composite oxide is represented by the general formula of $Li_wNa_{2-x}M1_yTi_{6-z}M2_zO_{13+\delta}$. The composite oxide can contain the Li inserting sites which are comparatively large per unit lattice volume. In addition, in the composite oxide, the potential can be continuously and gently changed in a potential range of 1.0 v to 1.45 V (vs.

Li/Li$^+$) accompanying the change of the state-of-charge. Further, the composite oxide has the crystal structure from which lithium ions can be easily extracted, and can increase the charge-and-discharge capacity. As a result, this active material for a battery can realize a nonaqueous electrolyte battery capable of exhibiting high energy density and excellent rapid charge-and-discharge characteristics, and capable of easily controlling the charge-and-discharge state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a composite oxide having a monoclinic crystal structure and represented by a general formula of $Li_wNa_{2-x}M1_yTi_{6-z}M2_zO_{13+\delta}$:
    wherein
    M1 is at least one metallic element selected from the group consisting of Mg, Sr, Ca, Ba, Cs and K;
    M2 is at least one metallic element selected from the group consisting of Zr, Sn, V, Nb, Ta, Mo, W, Fe, Co, Mn and Al;
    a value of the subscript w is within a range of $0 \le w \le 6$; a value of the subscript x is within a range of $0.25 \le x \le 1.75$; a value of the subscript y is within a range of $0 \le y \le 1$; a value of the subscript z is within a range of $0.1 \le z \le 1.9$; and a value of the subscript $\delta$ is within a range of $-0.1 \le \delta \le 0.1$, and
    wherein the value of the subscript x is larger than the value of the subscript y.

2. The active material according to claim 1, wherein the M2 is at least one metallic element selected from the group consisting of tetravalent Zr and Sn, pentavalent V, Nb and Ta, hexavalent Mo and W, and trivalent Fe, Co, Mn and Al.

3. The active material according to claim 1, wherein the value of the subscript y is 0.

4. The active material according to claim 1, wherein the M2 comprises Nb.

5. The active material according to claim 1, wherein the composite oxide has a volume of a unit crystal lattice of 519 Å$^3$ to 900 Å$^3$.

6. The active material according to claim 1, which is used for a battery.

7. A nonaqueous electrolyte battery comprising:
    a negative electrode comprising the active material according to claim 1;
    a positive electrode; and
    a nonaqueous electrolyte.

8. A battery pack comprising a nonaqueous electrolyte battery according to claim 7.

9. The battery pack according to claim 8, further comprises:
    a power distribution external terminal; and
    a protective circuit.

10. A battery pack comprises nonaqueous electrolyte batteries, each of the nonaqueous electrolyte batteries comprising:
    a negative electrode comprising the active material according to claim 1;
    a positive electrode; and
    a nonaqueous electrolyte;
    wherein the nonaqueous electrolyte batteries are connected in series, in parallel or with a combination of series connection and parallel connection.

11. A vehicle comprising the battery pack according to claim 8.

12. The vehicle according to claim 11, wherein the battery pack is configured to recover a regenerative energy caused by a power of the vehicle.

13. The active material according to claim 1, wherein the composite oxide has a symmetry belonging to a space group of C2/m.

14. The nonaqueous electrolyte battery according to claim 7, wherein a potential in the negative electrode is continuously and gently changed in a potential range of 1.0 V to 1.45 V (vs. Li/Li$^+$) accompanying a change of a state-of-charge.

15. The nonaqueous electrolyte battery according to claim 7, wherein an average operating potential of the negative electrode is within a range of 1.0 V to 1.5 V (vs. Li/Li$^+$).

16. An electrode, comprising the active material according to claim 1.

* * * * *